US011703380B2

(12) United States Patent
Fukuzawa et al.

(10) Patent No.: US 11,703,380 B2
(45) Date of Patent: Jul. 18, 2023

(54) RECEIVING DEVICE, TRANSCEIVER DEVICE, COMMUNICATION SYSTEM, PORTABLE TERMINAL DEVICE, AND PHOTODETECTION ELEMENT

(71) Applicant: TDK CORPORATION, Tokyo (JP)

(72) Inventors: Hideaki Fukuzawa, Tokyo (JP); Tomohito Mizuno, Tokyo (JP); Tetsuya Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/507,088

(22) Filed: Oct. 21, 2021

(65) Prior Publication Data
US 2022/0178741 A1 Jun. 9, 2022

(30) Foreign Application Priority Data

Oct. 23, 2020 (JP) .................................. 2020-178235
Jun. 23, 2021 (JP) .................................. 2021-103981
Aug. 3, 2021 (JP) .................................. 2021-127523

(51) Int. Cl.
*G01J 1/42* (2006.01)
*H01F 10/32* (2006.01)
*H04B 10/40* (2013.01)

(52) U.S. Cl.
CPC .............. *G01J 1/42* (2013.01); *H01F 10/329* (2013.01); *H04B 10/40* (2013.01)

(58) Field of Classification Search
CPC ........ G01J 1/42; G01J 2001/4446; G01J 1/44; H01F 10/329; H01F 10/3272; H01F 10/3286; H01F 10/325; H01F 10/3254; H04B 10/40; H01L 43/065; H01L 43/08; H01L 43/10; H01L 43/14
See application file for complete search history.

(56) References Cited

U.S. PATENT DOCUMENTS

| | | | |
|---|---|---|---|
| 6,925,261 B2 | 8/2005 | Haruyama | |
| 9,842,874 B2 | 12/2017 | Nakata | |
| 2001/0040713 A1 | 11/2001 | Haruyama | |
| 2002/0063919 A1 | 5/2002 | Kovar et al. | |
| 2007/0223149 A1* | 9/2007 | Kim | ........................ H01F 41/34 |
| 2008/0284010 A1 | 11/2008 | Romig | |
| 2010/0008675 A1 | 1/2010 | De Dobbelaere | |

(Continued)

FOREIGN PATENT DOCUMENTS

JP 2001-292107 A 10/2001

OTHER PUBLICATIONS

Chen et al.; "All-Optical Switching of Magnetic Tunnel Junctions with Single Subpicosecond Laser Pulses;" Physical Review Applied; 2017; vol. 7, 021001-1-021001-6.

(Continued)

*Primary Examiner* — Thanh Luu
(74) *Attorney, Agent, or Firm* — Oliff PLC

(57) ABSTRACT

A receiving device includes a magnetic element having a first ferromagnetic layer, a second ferromagnetic layer, and a spacer layer sandwiched between the first ferromagnetic layer and the second ferromagnetic layer, wherein the first ferromagnetic layer is configured to be irradiated with light containing an optical signal with a change of intensity of the light, and wherein the receiving device is configured to receive the optical signal on a basis of an output voltage from the magnetic element.

32 Claims, 13 Drawing Sheets

(56) References Cited

U.S. PATENT DOCUMENTS

| | | | |
|---|---|---|---|
| 2015/0333839 A1* | 11/2015 | Li | H04B 10/532 |
| | | | 398/152 |
| 2021/0159392 A1* | 5/2021 | Prasad | G11C 11/1675 |
| 2021/0404867 A1* | 12/2021 | Jaiswal | H01L 43/04 |
| 2022/0010423 A1 | 1/2022 | Suzuki et al. | |
| 2022/0068537 A1 | 3/2022 | Mizuno et al. | |
| 2022/0260425 A1* | 8/2022 | Jacob | G01J 5/22 |

OTHER PUBLICATIONS

Azim et al., "Optical Receiver With Helicity-Dependent Magetization Reversal", IEEE Transactions on Magnetics, Jan. 1, 2019, vol. 55, No. 1, pp. 1-6.

Machida et al., "Spin Transfer Switching and MR Properties of Co/Pt Multilayered Free Layers for Submicron Sized Magneto-Optical Light Modulation Device", IEEE Transactions of Magnetics, Jun. 2010, vol. 46, No. 6, pp. 2171-2174.

Aug. 15, 2022 Office Action issued in U.S. Appl. No. 17/507,143.

Dec. 16, 2022 Notice of Allowance Issued in U.S. Appl. No. 17/507,143.

U.S. Appl. No. 17/559,135, filed Dec. 22, 2021 in the name of Hideaki Fukuzawa.

U.S. Appl. No. 17/507,143, filed Oct. 21, 2021 in the name of Hideaki Fukuzawa.

U.S. Appl. No. 17/845,050, filed Jun. 21, 2022 in the name of Takekazu Yamane.

* cited by examiner

RECEIVING DEVICE, TRANSCEIVER DEVICE, COMMUNICATION SYSTEM, PORTABLE TERMINAL DEVICE, AND PHOTODETECTION ELEMENT

BACKGROUND

The present disclosure relates to a receiving device, a transceiver device, a communication system, a portable terminal device, and a photodetection element.

Priority is claimed on Japanese Patent Application No. 2020-178235, filed Oct. 23, 2020, Japanese Patent Application No. 2021-103981, filed Jun. 23, 2021, and Japanese Patent Application No. 2021-127523, filed Aug. 3, 2021, the content of which is incorporated herein by reference.

With the spread of the Internet, an amount of communication has increased dramatically and the importance of optical communication is significantly increasing. Optical communication is a communication means configured to convert an electrical signal into an optical signal and perform transmission and reception using the optical signal.

For example, Patent Document 1 describes a receiving device configured to receive an optical signal using a photodiode. The photodiode is, for example, a pn junction diode using a pn junction of a semiconductor or the like.

PATENT DOCUMENTS

[Patent Document 1] Japanese Unexamined Patent Application, First Publication No. 2001-292107

SUMMARY

With the development of information and communication technology, a higher communication speed is required. In optical communication, higher frequencies for signal modulation are required to implement high-speed communication. There is a problem that reception sensitivity significantly deteriorates due to an increase in a frequency in a semiconductor photodiode shown in Patent Document 1, but novel breakthroughs are required for further development.

It is desirable to provide a novel receiving device, transceiver device, communication system, portable terminal device, and photodetection element and provide a receiving device, a transceiver device, a communication system, a portable terminal device, and a photodetection element for enabling high-speed communication.

The following means is provided.

(1): According to a first aspect, there is provided a receiving device including: a magnetic element having a first ferromagnetic layer, a second ferromagnetic layer, and a spacer layer sandwiched between the first ferromagnetic layer and the second ferromagnetic layer, wherein the first ferromagnetic layer is configured to be irradiated with light containing an optical signal with a change of intensity of the light, and wherein the receiving device is configured to receive the optical signal on a basis of an output voltage from the magnetic element.

(2): In the receiving device according to the above-described aspect, the output voltage from the magnetic element may change in correspondence with the change in the intensity of the light applied to the first ferromagnetic layer.

(3): In the receiving device according to the above-described aspect, an angle between a magnetization direction of the first ferromagnetic layer in a state in which the light is not applied to the first ferromagnetic layer and a magnetization direction of the first ferromagnetic layer in a state in which the light is applied to the first ferromagnetic layer may be larger than 0° and smaller than 90°.

(4): In the receiving device according to the above-described aspect, the optical signal may have intensities of at least two levels, and, under a condition that a magnitude of the output voltage from the magnetic element has a first value when the intensity of the light applied to the first ferromagnetic layer is a first intensity and has a second value when the intensity of the light applied to the first ferromagnetic layer is a second intensity and the second intensity is greater than the first intensity, current may flow from the first ferromagnetic layer to the second ferromagnetic layer when the second value is larger than the first value, and current may flow from the second ferromagnetic layer to the first ferromagnetic layer when the second value is smaller than the first value.

(5): The receiving device according to the above-described aspect may further include a hard bias layer configured to apply a bias magnetic field to the first ferromagnetic layer, wherein the hard bias layer may be at a position overlapping the first ferromagnetic layer when viewed from any direction orthogonal to a lamination direction of the magnetic element, and wherein a magnetization direction of the hard bias layer may be opposite to a magnetization direction of the first ferromagnetic layer in a state in which the light is not applied to the first ferromagnetic layer.

(6): In the receiving device according to the above-described aspect, the magnetic element may further include a first electrode connected to the first ferromagnetic layer and a second electrode connected to the second ferromagnetic layer, and the first electrode may have transparency to light in a wavelength range used for the optical signal.

(7): The receiving device according to the above-described aspect may further include a soft magnetic material, wherein the soft magnetic material may cover at least a part of outer circumference of the magnetic element from outside in a plan view from a lamination direction of the magnetic element.

(8): In the receiving device according to the above-described aspect, the soft magnetic material may be positioned above and below the magnetic element in the lamination direction, and the soft magnetic material at a side of the first ferromagnetic layer within the soft magnetic material positioned above and below the magnetic element may have an opening.

(9): In the receiving device according to the above-described aspect, the opening may have a mesh-like magnetic net connected to the soft magnetic material.

(10): In the receiving device according to the above-described aspect, the output voltage from the magnetic element greater than or equal to a threshold value may be processed as a first signal and the output voltage from the magnetic element less than the threshold value may be processed as a second signal.

(11): In the receiving device according to the above-described aspect, a signal indicating that the output voltage from the magnetic element changes within a prescribed time period may be processed as a first signal and a signal indicating that the output voltage from the magnetic element does not change within the prescribed time period may be processed as a second signal.

(12): The receiving device according to the above-described aspect may further include an integrated circuit, wherein the magnetic element and the integrated circuit may be formed on the same substrate via an interlayer insulating film, and wherein the integrated circuit and the magnetic element may be connected via through wiring that passes through the interlayer insulating film.

(13) According to a second aspect, there is provided a transceiver device including: the receiving device according to the above-described aspect; and a transmission device configured to transmit an optical signal.

(14) According to a third aspect, there is provided a communication system including: a plurality of transceiver devices, each of which is the transceiver device according to the above-described aspect.

(15) According to a fourth aspect, there is provided a portable terminal device including the receiving device according to the above-described aspect.

(16) According to a fifth aspect, there is provided a photodetection element including: a first ferromagnetic layer; a second ferromagnetic layer; and a spacer layer sandwiched between the first ferromagnetic layer and the second ferromagnetic layer, wherein an output voltage changes in correspondence with a change in intensity of light applied to the first ferromagnetic layer.

(17): In the photodetection element according to the above-described aspect, an angle between a magnetization direction of the first ferromagnetic layer in a state in which the light is not applied to the first ferromagnetic layer and a magnetization direction of the first ferromagnetic layer in a state in which the light is applied to the first ferromagnetic layer may be larger than 0° and smaller than 90°.

(18): In the photodetection element according to the above-described aspect, an optical signal having intensities of at least two levels may be applied, and, under a condition that a magnitude of an output voltage has a first value when the intensity of the light applied to the first ferromagnetic layer is a first intensity and has a second value when the intensity of the light applied to the first ferromagnetic layer is a second intensity and the second intensity is greater than the first intensity, current may flow from the first ferromagnetic layer to the second ferromagnetic layer when the second value is larger than the first value, and current may flow from the second ferromagnetic layer to the first ferromagnetic layer when the second value is smaller than the first value.

The receiving device, the transceiver device, the communication system, the portable terminal device, and the photodetection element according to the above aspects are novel and create a novel breakthrough. Also, the receiving device, the transceiver device, the communication system, the portable terminal device, and the photodetection element according to the above aspects can perform high-speed communication.

DETAILED DESCRIPTION

Figure 1:
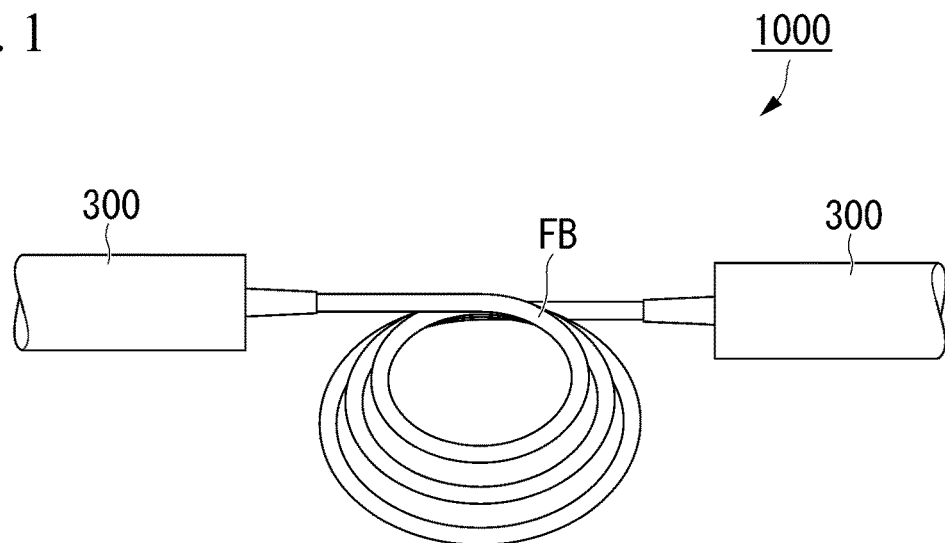
FIG. 1 is a conceptual diagram of a communication system according to a first embodiment.

Hereinafter, the present embodiment will be described in detail with reference to the drawings as appropriate. In the drawings used in the following description, featured parts may be enlarged parts for convenience so that the features of the present disclosure are easier to understand, and dimensional ratios and the like of the respective components may be different from actual ones. Materials, dimensions, and the like exemplified in the following description are examples, the present disclosure is not limited thereto, and modifications can be appropriately made in a range in which advantageous effects of the present disclosure are exhibited.

Directions will be defined. A lamination direction of a photodetection element 10 is defined as a z direction, one direction within a plane orthogonal to the z direction is an x direction, and a direction orthogonal to the x direction and the z direction is defined as a y direction. The z direction is an example of the lamination direction. Hereinafter, a +z direction may be expressed as an "upward" direction and a −z direction may be expressed as a "downward" direction. Hereinafter, the +z direction is a direction from a substrate Sb to the photodetection element 10. The upward and downward directions do not always coincide with a direction in which gravity is applied.

First Embodiment

FIG. 1 is a conceptual diagram of a communication system 1000 according to a first embodiment. The communication system 1000 shown in FIG. 1 includes a plurality of transceiver devices 300 and a fiber FB connected between the transceiver devices 300. The communication system 1000 can be used, for example, for short- and medium-distance communication within and between data centers, and long-distance communication between cities. The transceiver device 300 is installed in, for example, a base station or a backbone station of a long-distance communication network within a data center. For example, the fiber FB is connected between data centers. The communication system 1000 performs communication between the transceiver device 300 via, for example, the fiber FB. The communication system 1000 may perform wireless communication between the transceiver device 300 without involving the fiber FB.

Figure 2:
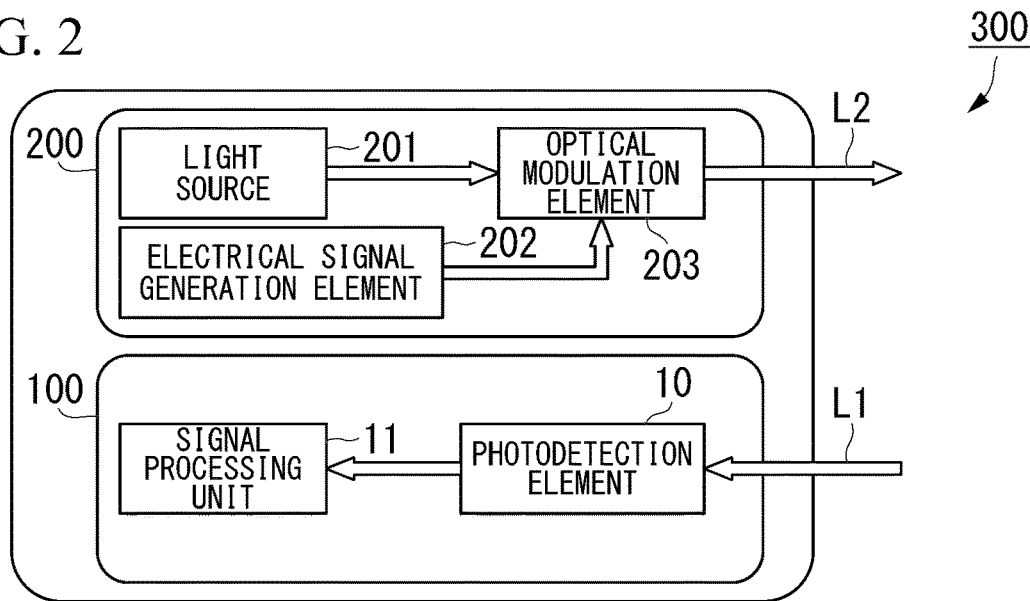
FIG. 2 is a block diagram of a transceiver device according to the first embodiment.

FIG. 2 is a block diagram of the transceiver device 300 according to the first embodiment. The transceiver device 300 includes a receiving device 100 and a transmission device 200. The receiving device 100 receives an optical signal L1 and the transmission device 200 transmits an optical signal L2. Light in the present specification is not limited to visible light and also includes infrared light having a longer wavelength than the visible light and ultraviolet light having a shorter wavelength than the visible light.

The receiving device 100 includes, for example, the photodetection element 10 and a signal processing unit 11. The photodetection element 10 converts the optical signal L1 into an electrical signal. Details of the photodetection element 10 will be described below. The signal processing unit 11 processes the electrical signal after the conversion by the photodetection element 10. The signal processing unit 11 receives the signal included in the optical signal L1 by processing the electrical signal generated from the photodetection element 10.

The transmission device 200 includes, for example, a light source 201, an electrical signal generation element 202, and an optical modulation element 203. The light source 201 is, for example, a laser element. The light source 201 may be outside the transmission device 200. The electrical signal generation element 202 generates an electrical signal on the basis of transmission information. The electrical signal generation element 202 may be integrated with a signal conversion element of the signal processing unit 11. The optical modulation element 203 modulates the light output from the light source 201 on the basis of the electrical signal generated by the electrical signal generation element 202 and outputs the optical signal L2.

Figure 3:
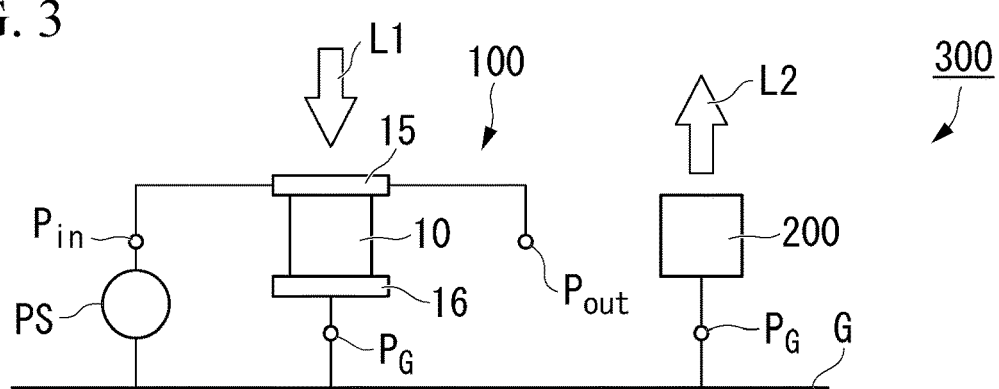
FIG. 3 is a circuit diagram of the transceiver device according to the first embodiment.

FIG. 3 is a circuit diagram of the transceiver device 300 according to the first embodiment. In FIG. 3, the signal processing unit 11 is omitted.

The receiving device 100 includes, for example, a photodetection element 10, a first electrode 15, a second electrode 16, an input terminal $P_{in}$, an output terminal $P_{out}$, and a reference potential terminal $P_G$. The first electrode 15 and the second electrode 16 sandwich the photodetection element 10 in the lamination direction. The first electrode 15 is, for example, an electrode on the side to which light including the optical signal L1 is applied.

The first electrode 15 is connected to, for example, the input terminal $P_{in}$ and the output terminal $P_{out}$. The second electrode 16 is connected to, for example, the reference potential terminal $P_G$. The input terminal $P_{in}$ is connected to a power supply PS. The power supply PS may be outside the receiving device 100. The power supply PS applies a sense current, a reset current, or the like to the photodetection element 10. When it is not necessary to cause an external current to flow through the photodetection element 10, the input terminal $P_{in}$ and the power supply PS may be omitted. For example, the output terminal $P_{out}$ outputs a voltage between the first electrode 15 and the second electrode 16 sandwiching the photodetection element 10 in the lamination direction. A resistance value of the photodetection element 10 in the lamination direction is obtained from Ohm's law by causing a sense current to flow through the photodetection element 10 in the lamination direction. The output terminal $P_{out}$ is connected to the signal processing unit 11. The reference potential terminal $P_G$ is connected to a reference potential and determines the reference potential of the receiving device 100. The reference potential in FIG. 3 is a potential of a ground G. The ground G may be provided outside the receiving device 100. The reference potential may be a potential other than the potential of the ground G.

The receiving device 100 and the transmission device 200 are connected to, for example, a common reference potential (the ground G). The reference potential may be different between the receiving device 100 and the transmission device 200. When the reference potentials of the receiving device 100 and the transmission device 200 are the same, the occurrence of noise can be reduced.

Figure 4:
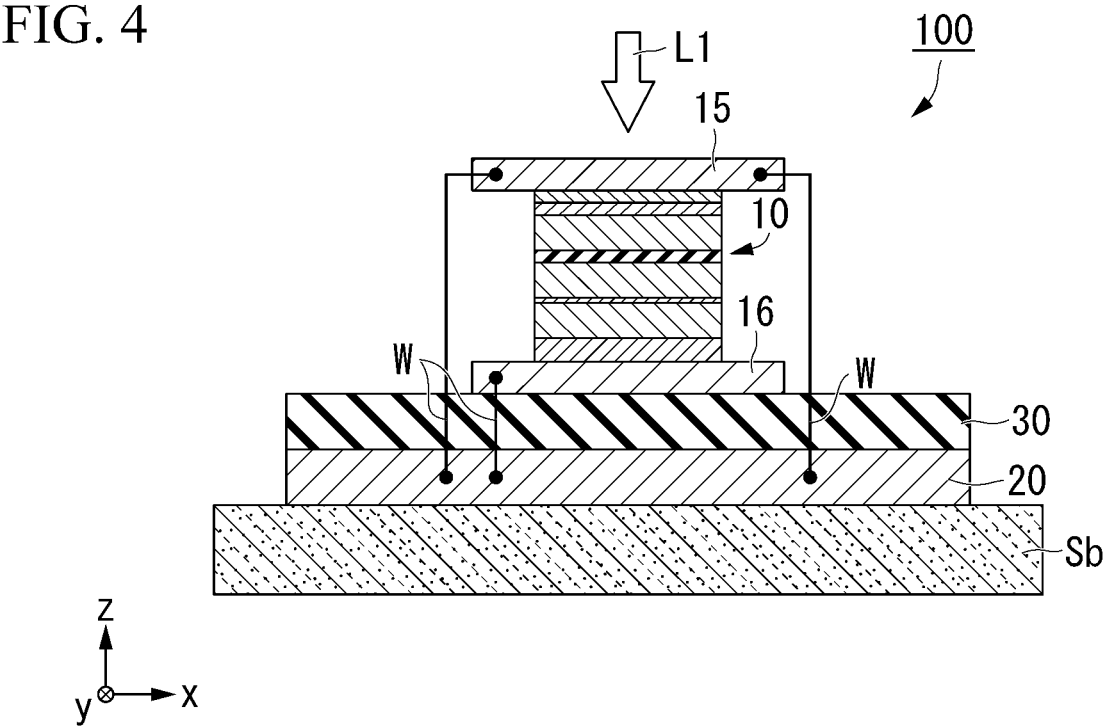
FIG. 4 is a cross-sectional view of a receiving device according to the first embodiment.

FIG. 4 is a cross-sectional view of the receiving device 100 according to the first embodiment. The receiving device 100 includes, for example, the photodetection element 10, an integrated circuit 20, and an interlayer insulating film 30. The photodetection element 10, the integrated circuit 20, and the interlayer insulating film 30 are formed on, for example, the same substrate Sb.

The integrated circuit 20 includes the signal processing unit 11 that processes a signal output from the photodetection element 10. In the integrated circuit 20, for example, the output voltage from the photodetection element 10 (the resistance value of the photodetection element 10 in the z direction) greater than or equal to a threshold value is processed as a first signal (for example, "1") and the output voltage less than the threshold value is processed as a second signal (for example, "0"). When the transmission device 200 is formed on the same substrate Sb, the integrated circuit 20 may include the light source 201, the electrical signal generation element 202, and the optical modulation element 203. The integrated circuit 20 and the photodetection element 10 are connected via, for example, through wiring w passing through the interlayer insulating film 30. These may be connected by wire bonding instead of the through wiring w.

The interlayer insulating film 30 is an insulator that insulates between wirings of multilayer wiring and between elements. The interlayer insulating film 30 is, for example, an oxide of Si, Al, or Mg, a nitride, or an oxynitride. The interlayer insulating film 30 is, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

Figure 5:
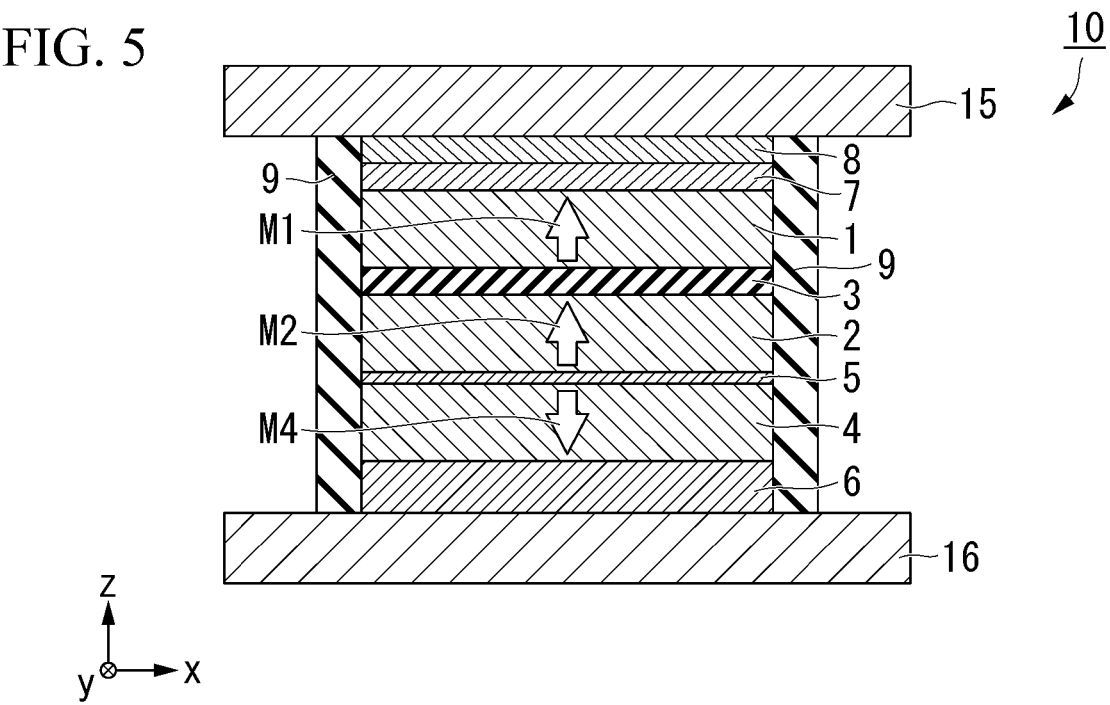
FIG. 5 is a cross-sectional view of a photodetection element according to the first embodiment.

FIG. 5 is a cross-sectional view of the photodetection element 10 according to the first embodiment. In FIG. 5, the first electrode 15 and the second electrode 16 are shown together and a direction of magnetization in an initial state of a ferromagnet is indicated by an arrow.

The photodetection element 10 is a magnetic element having at least a first ferromagnetic layer 1, a second ferromagnetic layer 2, and a spacer layer 3. The spacer layer 3 is positioned between the first ferromagnetic layer 1 and the second ferromagnetic layer 2. In addition to the above, the photodetection element 10 may have a third ferromagnetic layer 4, a magnetic coupling layer 5, a base layer 6, a perpendicular magnetization inducing layer 7, a cap layer 8, and a sidewall insulating layer 9.

The photodetection element 10 is, for example, a magnetic tunnel junction (MTJ) element in which the spacer layer 3 is made of an insulating material. In this case, the photodetection element 10 is an element in which a resistance value in the z direction (a resistance value when current flows in the z direction) changes in accordance with a change in a relative angle between the magnetization direction of the first ferromagnetic layer 1 and the magnetization direction of the second ferromagnetic layer 2. Such an element is also called a magnetoresistance effect element.

The first ferromagnetic layer 1 is a photodetection layer whose magnetization direction changes when light from the outside is applied to the first ferromagnetic layer 1. The first ferromagnetic layer 1 is also called a magnetization free layer. The magnetization free layer is a layer including a magnetic material whose magnetization direction changes when prescribed external energy is applied. The prescribed external energy is, for example, applied light from the outside, current flowing through the photodetection element 10 in the z direction, or an external magnetic field. Because a direction of the magnetization of a ferromagnet can vary with a high-speed change in the intensity of light applied to the ferromagnet (a high-frequency optical signal), the receiving device 100 can receive a high-frequency optical signal using the first ferromagnetic layer 1 as a photodetection layer and high-speed optical communication becomes possible.

The first ferromagnetic layer 1 includes a ferromagnet. The first ferromagnetic layer 1 includes, for example, at least one of Co, Fe, and Ni. The first ferromagnetic layer 1 includes, for example, a magnetic element such as Co, Fe, or Ni. The first ferromagnetic layer 1 may include nonmagnetic elements such as B, Mg, Hf, and Gd in addition to the above-described magnetic elements. The first ferromagnetic layer 1 may be, for example, an alloy including a magnetic element and a nonmagnetic element. The first ferromagnetic layer 1 may include a plurality of layers. The first ferromagnetic layer 1 is, for example, a CoFeB alloy, a laminate in which a CoFeB alloy layer is sandwiched between Fe layers, or a laminate in which a CoFeB alloy layer is sandwiched between CoFe layers.

In general, "ferromagnetism" includes "ferrimagnetism". The first ferromagnetic layer 1 may exhibit ferrimagnetism. On the other hand, the first ferromagnetic layer 1 may exhibit ferromagnetism except for ferrimagnetism. For example, the CoFeB alloy exhibits ferromagnetism except for ferrimagnetism.

The first ferromagnetic layer 1 may be a perpendicular magnetization film having an axis of easy magnetization in a direction (the z direction) perpendicular to a film surface or an in-plane magnetized film having an axis of easy magnetization in an in-plane direction (any direction within an xy plane). In order to realize perpendicular magnetization for the first magnetic layer 1, the first magnetic layer 1 may be an Fe-rich layer. For example, the concentration of Fe in the first magnetic layer may be more than 50 atomic %. For example, the concentration of Fe in the CoFeB alloy may also be more than 50 atomic %.

A thickness of the first ferromagnetic layer 1 is, for example, 1 nm or more and 5 nm or less. A thickness of the first ferromagnetic layer 1 may be, for example, 1 nm or more and 2 nm or less. When the first ferromagnetic layer 1 is a perpendicular magnetization film, the effect of applying perpendicular magnetic anisotropy from the layers positioned above and below the first ferromagnetic layer 1 is strengthened and the perpendicular magnetic anisotropy of the ferromagnetic layer 1 is increased if the thickness of the first ferromagnetic layer 1 is thin. That is, when the perpendicular magnetic anisotropy of the first ferromagnetic layer 1 is high, the force for the magnetization to return in the z direction is strengthened. On the other hand, if the thickness of the first ferromagnetic layer 1 is thick, the effect of applying the perpendicular magnetic anisotropy from the layers positioned above and below the first ferromagnetic layer 1 is relatively weakened and the perpendicular magnetic anisotropy of the first ferromagnetic layer 1 is weakened.

A volume of a ferromagnet becomes small when the thickness of the first ferromagnetic layer 1 becomes thin and the volume of the ferromagnet becomes large when the thickness of the first ferromagnetic layer 1 becomes thick. The susceptibility of the magnetization of the first ferromagnetic layer 1 when external energy has been applied is inversely proportional to a product (KuV) of the magnetic anisotropy (Ku) and the volume (V) of the first ferromagnetic layer 1. That is, when the product of the magnetic anisotropy of the first ferromagnetic layer 1 and the volume becomes small, the reactivity to the optical signal L1 at an ultra-high speed increases. From this point of view, in accordance with ultra-high speed of the optical communication, the magnetic anisotropy of the first ferromagnetic layer 1 may be appropriately designed and then the volume of the first ferromagnetic layer 1 may be reduced. That is, a thickness of the first ferromagnetic layer 1 may be reduced for ultra-high-speed communication.

When the thickness of the first ferromagnetic layer 1 is thicker than 2 nm, an insertion layer made of, for example, Mo and W may be provided within the first ferromagnetic layer 1. That is, the first ferromagnetic layer 1 may be a laminate in which the ferromagnetic layer, the insertion layer, and the ferromagnetic layer are laminated in that order in the z direction. Interfacial magnetic anisotropy at an interface between the insertion layer and the ferromagnetic layer enhances the perpendicular magnetic anisotropy of the entire first ferromagnetic layer 1. A thickness of the insertion layer is, for example, 0.1 nm to 0.6 nm.

The second ferromagnetic layer 2 is a magnetization fixed layer. The magnetization fixed layer is a layer made of a magnet whose magnetization direction is less likely to change than that of the magnetization free layer when prescribed external energy has been applied. For example, coercivity of the second ferromagnetic layer 2 is greater than that of the first ferromagnetic layer 1. The second ferromagnetic layer 2 has an axis of easy magnetization in the same direction as the first ferromagnetic layer 1. The second ferromagnetic layer 2 may be either an in-plane magnetization film or a perpendicular magnetization film.

For example, the material constituting the second ferromagnetic layer 2 is similar to that of the first ferromagnetic layer 1. The second ferromagnetic layer 2 may be, for example, a laminate in which Co having a thickness of 0.4 nm to 1.0 nm, Mo having a thickness of 0.1 nm to 0.5 nm, a CoFeB alloy having a thickness of 0.3 nm to 1.0 nm, and Fe having a thickness of 0.3 nm to 1.0 nm are laminated in that order.

The magnetization of the second ferromagnetic layer 2 may be fixed by, for example, magnetic coupling to the third ferromagnetic layer 4 via the magnetic coupling layer 5. In this case, a combination of the second ferromagnetic layer 2, the magnetic coupling layer 5, and the third ferromagnetic layer 4 may be called a magnetization fixed layer.

The third ferromagnetic layer 4 is magnetically coupled to, for example, the second ferromagnetic layer 2. The magnetic coupling is, for example, antiferromagnetic coupling and is caused by Ruderman-Kittel-Kasuya-Yosida (RKKY) interaction. The material constituting the third ferromagnetic layer 4 is, for example, similar to that of the first ferromagnetic layer 1. The third ferromagnetic layer 4 is, for example, a laminated film in which Co and Pt are alternately laminated, and a laminated film in which Co and Ni are alternately laminated. The magnetic coupling layer 5 is, for example, Ru, Ir, or the like. A thickness of the magnetic coupling layer 5 is, for example, a thickness at which the second ferromagnetic layer 2 and the third ferromagnetic layer 4 are antiferromagnetically coupled by the RKKY interaction.

The spacer layer 3 is a nonmagnetic layer arranged between the first ferromagnetic layer 1 and the second ferromagnetic layer 2. The spacer layer 3 includes a layer made of a conductor, an insulator, or a semiconductor or a layer including a current carrying point formed of a conductor within an insulator. A thickness of the spacer layer 3 can be adjusted in accordance with orientation directions of the magnetization M1 of the first ferromagnetic layer 1 and the magnetization M2 of the second ferromagnetic layer 2 in an initial state to be described below.

For example, when the spacer layer 3 is made of an insulator, the photodetection element 10 has a magnetic tunnel junction (MTJ) including the first ferromagnetic layer 1, the spacer layer 3, and the second ferromagnetic layer 2. Such an element is called an MTJ element. In this case, the photodetection element 10 can exhibit a tunnel magnetoresistance (TMR) effect. For example, when the spacer layer 3 is made of a metal, the photodetection element 10 can exhibit a giant magnetoresistance (GMR) effect. Such an element is called a GMR element. The photodetection element 10 may be called the MTJ element, the GMR element, or the like, which differs according to the constituent material of the spacer layer 3, but they may also be collectively called magnetoresistance effect elements.

When the spacer layer 3 is made of an insulating material, materials including aluminum oxide, magnesium oxide, titanium oxide, silicon oxide, and the like can be used. Also, the above insulating materials may include elements such as Al, B, Si, and Mg and magnetic elements such as Co, Fe, and Ni. A high magnetoresistance change rate can be obtained by adjusting the thickness of the spacer layer 3 so that a strong TMR effect is exhibited between the first ferromagnetic layer 1 and the second ferromagnetic layer 2. In order to use the TMR effect efficiently, the thickness of the spacer layer 3 may be about 0.5 to 5.0 nm or about 1.0 to 2.5 nm.

When the spacer layer 3 is made of a nonmagnetic conductive material, a conductive material such as Cu, Ag, Au, or Ru can be used. In order to use the GMR effect efficiently, the thickness of the spacer layer 3 may be about 0.5 to 5.0 nm or about 2.0 to 3.0 nm.

When the spacer layer 3 is made of a nonmagnetic semiconductor material, a material such as zinc oxide, indium oxide, tin oxide, germanium oxide, gallium oxide, or indium tin oxide (ITO) can be used. In this case, the thickness of the spacer layer 3 may be about 1.0 to 4.0 nm.

When a layer including a current carrying point made of a conductor within a nonmagnetic insulator is applied as the spacer layer 3, a structure may be formed to include a current carrying point made of a nonmagnetic conductor of Cu, Au, Al, or the like within the nonmagnetic insulator made of aluminum oxide or magnesium oxide. Also, the conductor may be made of a magnetic element such as Co, Fe, or Ni. In this case, a thickness of the spacer layer 3 may be about 1.0 to 2.5 nm. The current carrying point is, for example, a columnar body having a diameter of 1 nm or more and 5 nm or less when viewed from a direction perpendicular to a film surface.

A base layer 6 shown in FIG. 5 is, for example, on the second electrode 16. The base layer 6 is a seed layer or a buffer layer. The seed layer enhances the crystallinity of the layer laminated on the seed layer. The seed layer is, for example, Pt, Ru, Hf, Zr, or NiFeCr. A thickness of the seed layer is, for example, 1 nm or more and 5 nm or less. The buffer layer is a layer that alleviates lattice mismatch between different crystals. The buffer layer is, for example, Ta, Ti, W, Zr, Hf, or a nitride of these elements. A thickness of the buffer layer is, for example, 1 nm or more and 5 nm or less.

A perpendicular magnetization inducing layer 7 is formed when the first ferromagnetic layer 1 is a perpendicular magnetization film. The perpendicular magnetization inducing layer 7 is laminated on the first ferromagnetic layer 1. The perpendicular magnetization inducing layer 7 induces perpendicular magnetic anisotropy of the first ferromagnetic layer 1. The perpendicular magnetization inducing layer 7 is, for example, magnesium oxide, W, Ta, Mo, or the like. When the perpendicular magnetization inducing layer 7 is magnesium oxide, magnesium oxide may be oxygen-deficient to increase conductivity. A thickness of the perpendicular magnetization inducing layer 7 is, for example, 0.5 nm or more and 2.0 nm or less.

The cap layer 8 is positioned between the first ferromagnetic layer 1 and the first electrode 15. The cap layer 8 prevents damage to a lower layer during the process and enhances the crystallinity of the lower layer during annealing. A thickness of the cap layer 8 is, for example, 3 nm or less so that the first ferromagnetic layer 1 is irradiated with sufficient light.

The sidewall insulating layer 9 covers the periphery of the laminate including the first ferromagnetic layer 1 and the second ferromagnetic layer 2. The sidewall insulating layer 9 is made of, for example, a material similar to that of the interlayer insulating film 30.

The first electrode 15 has, for example, transparency to light in the wavelength range used for the optical signal L1. The wavelength range of light used for the optical signal L1 is, for example, 300 nm or more and 2 µm or less, and includes a visible light range and a near-infrared light range. The first electrode 15 is a transparent electrode including a transparent electrode material of an oxide such as indium tin oxide (ITO), indium zinc oxide (IZO), zinc oxide (ZnO), or indium gallium zinc oxide (IGZO). The first electrode 15 may be configured to have a plurality of columnar metals among these transparent electrode materials. In this case, a film thickness of the first electrode 15 is, for example, 10 nm to 300 nm. It is not essential to use the above-described transparent electrode material as the first electrode 15 and external light may be able to be allowed to reach the first ferromagnetic layer 1 using a metallic material such as Au, Cu, or Al with a thin film thickness. When a metal is used as the material of the first electrode 15, the film thickness of the first electrode 15 is, for example, 3 to 10 nm. In particular, Au has higher transmittance for light having a wavelength near a blue wavelength of light than other metallic materials. Also, the first electrode 15 may have an antireflection film on an irradiation surface irradiated with light.

The second electrode 16 is made of a conductive material. The second electrode 16 is made of, for example, a metal such as Cu, Al, or Au. Ta and/or Ti may be laminated on the top and bottom of the above metals. Also, a laminated film of Cu and Ta, a laminated film of Ta, Cu, and Ti, and a laminated film of Ta, Cu, and TaN may be used. Also, TiN and/or TaN may be used as the second electrode 16. A film thickness of the second electrode 16 is, for example, 200 nm to 800 nm. The second electrode 16 may be made transparent to light in the wavelength range used for the optical signal L1. As the material of the second electrode 16, as in the first electrode 15, for example, a transparent electrode material of an oxide such as indium tin oxide (ITO), indium zinc oxide (IZO), zinc oxide (ZnO), or indium gallium zinc oxide (IGZO) may be used. Even if light is applied from the first electrode 15, the light may reach the second electrode 16 according to the intensity of the light. In this case, the second electrode 16 is configured to include a transparent electrode material of an oxide, so that the reflection of light at an interface between the second electrode 16 and a layer in contact with the second electrode 16 can be limited as compared with the case where the second electrode 16 is made of a metal.

The photodetection element 10 is manufactured in a laminating process, an annealing process, and a processing process of each layer. First, layers are laminated in the order of the base layer 6, the third ferromagnetic layer 4, the magnetic coupling layer 5, the second ferromagnetic layer 2, the spacer layer 3, the first ferromagnetic layer 1, the perpendicular magnetization inducing layer 7, and the cap layer 8 on the second electrode 16. Each layer is formed by, for example, sputtering.

Subsequently, the laminated film is annealed. An annealing temperature is, for example, 250° C. to 450° C. When the laminated film is formed on the same substrate as the semiconductor circuit, it may be annealed at 400° C. or higher. Subsequently, the laminated film is processed into a prescribed columnar body by photolithography and etching. The columnar body may be a cylindrical body or a prismatic body. For example, the shortest width when the columnar body is viewed from the z direction may be 10 nm or more and 2000 nm or less or 30 nm or more and 500 nm or less.

Subsequently, an insulating layer is formed to cover the side surface of the columnar body. The insulating layer is the sidewall insulating layer 9. The sidewall insulating layer 9 may be laminated a plurality of times. Subsequently, the upper surface of the cap layer 8 is exposed from the sidewall insulating layer 9 by chemical mechanical polishing (CMP), and the first electrode 15 is produced on the cap layer 8. In the above-described process, the photodetection element 10 is obtained.

Next, an operation of the photodetection element 10 according to the first embodiment will be described. The first ferromagnetic layer 1 is irradiated with light including the optical signal L1 having a change in an intensity of light. A lens may be arranged on the side of the first ferromagnetic layer 1 in the lamination direction of the photodetection element 10 so that condensed light is applied to the first ferromagnetic layer 1 via the lens. The lens may be formed in a wafer process of forming the photodetection element 10. The resistance value of the photodetection element 10 in the z direction changes by irradiating the first ferromagnetic layer 1 with light including the optical signal L1. The case where intensities of the light applied to the first ferromagnetic layer 1 are two levels of the first intensity and the second intensity will be described as an example. The second intensity is set to be greater than the first intensity. The first intensity may correspond to the case where the intensity of the light applied to the first ferromagnetic layer 1 is zero.

The operation of the photodetection element 10 according to the first embodiment has two patterns. A first pattern corresponds to the case where the output voltage from the photodetection element 10 is higher in the case of the second intensity than in the case of the first intensity. A second pattern corresponds to the case where the output voltage from the photodetection element 10 is higher in the case of the first intensity than in the case of the second intensity.

Figure 6:
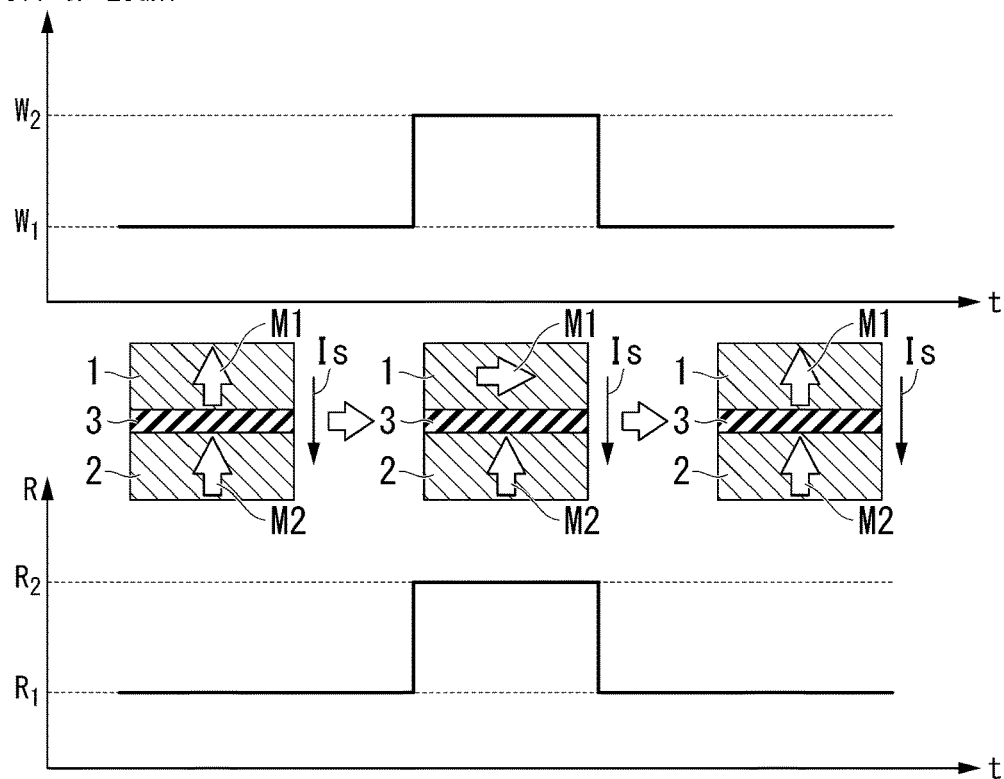
FIG. 6 is a schematic diagram for describing an operation of a first pattern of the photodetection element according to the first embodiment in a first mechanism.
Figure 7:
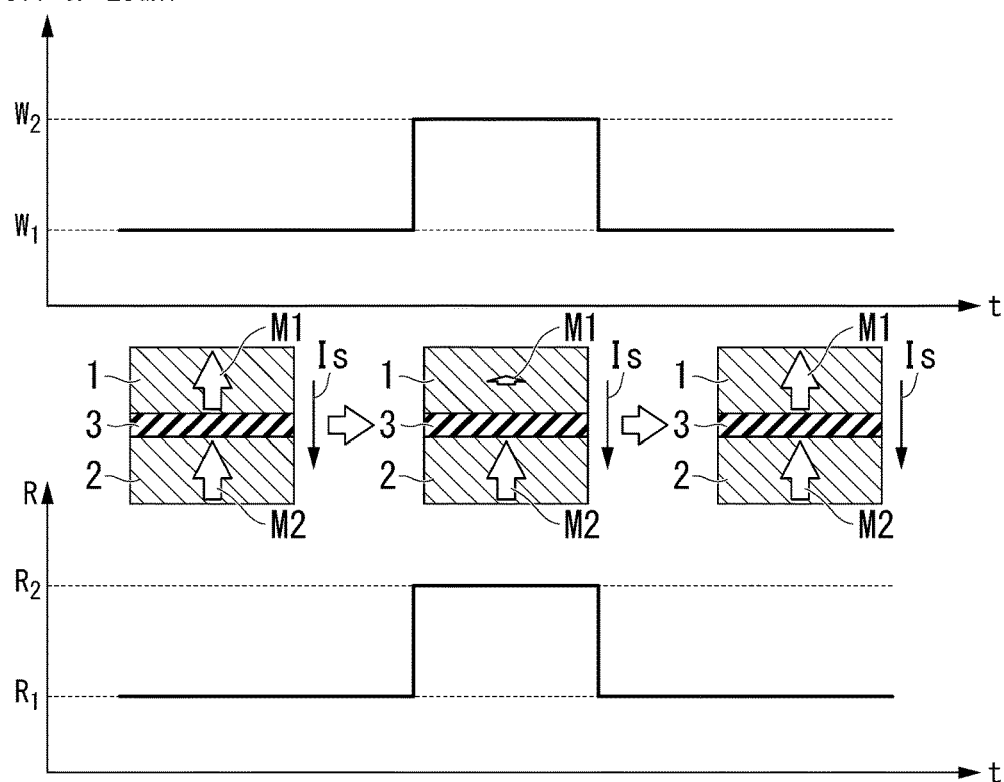
FIG. 7 is a schematic diagram for describing the operation of the first pattern of the photodetection element according to the first embodiment in a second mechanism.

FIGS. 6 and 7 are diagrams for describing the operation of the first pattern of the photodetection element 10 according to the first embodiment. Two mechanisms are considered as the operating mechanism of the photodetection element 10, FIG. 6 is a diagram for describing the first mechanism, and FIG. 7 is a diagram for describing the second mechanism. In the upper graphs of FIGS. 6 and 7, the vertical axis represents an intensity of light applied to the first ferromagnetic layer 1 and the horizontal axis represents time. In the lower graphs of FIGS. 6 and 7, the vertical axis represents a resistance value of the photodetection element 10 in the z direction and the horizontal axis represents time.

First, in a state in which the first ferromagnetic layer 1 is irradiated with light of the first intensity (hereinafter called an initial state), there is a relationship in which the magnetization M1 of the first ferromagnetic layer 1 is parallel to the magnetization M2 of the second ferromagnetic layer 2, a resistance value of the photodetection element 10 in the z direction is a first resistance value $R_1$, and a magnitude of the output voltage from the photodetection element 10 has a first value. The resistance value of the photodetection element 10 in the z direction is obtained by causing a sense current is to flow through the photodetection element 10 in the z direction to generate a voltage across both ends of the photodetection element 10 in the z direction and using Ohm's law from a voltage value. The output voltage from the photodetection element 10 is generated between the first electrode 15 and the second electrode 16. In the case of the first pattern shown in FIG. 6, the sense current Is may flow in a direction from the first ferromagnetic layer 1 to the second ferromagnetic layer 2. By causing the sense current Is to flow in the above direction, a spin transfer torque in a direction, which is the same as that of the magnetization M2 of the second ferromagnetic layer 2, acts on the magnetization M1 of the first ferromagnetic layer 1 and the magnetization M1 becomes parallel to the magnetization M2 in the initial state. Also, by causing the sense current Is to flow in the above direction, it is possible to prevent the magnetization M1 of the first ferromagnetic layer 1 from being inverted during operation.

Next, the intensity of the light applied to the first ferromagnetic layer 1 changes from the first intensity to the second intensity. The second intensity is greater than the first intensity and the magnetization M1 of the first ferromagnetic layer 1 changes from the initial state due to the external energy generated by the radiation of light. The state of the magnetization M1 is, for example, a tilt angle with respect to the z direction, a magnitude, or the like. For example, as shown in FIG. 6, when the intensity of the light applied to the first ferromagnetic layer 1 changes from the first intensity to the second intensity, the magnetization M1 is tilted in the z direction. An angle between the direction of the magnetization M1 of the first ferromagnetic layer 1 in a state in which light including the optical signal L1 is not applied to the first ferromagnetic layer 1 and the magnetization direction of the first ferromagnetic layer 1 at the second intensity is greater than 0° and less than 90°. Also, for example, as shown in FIG. 7, when the intensity of the light applied to the first ferromagnetic layer 1 changes from the first intensity to the second intensity, the magnitude of the magnetization M1 becomes small. The magnetization M1 of the first ferromagnetic layer 1 in a state in which the light including the optical signal L1 is applied to the first ferromagnetic layer 1 is more demagnetized than the magnetization M1 of the first ferromagnetic layer 1 in a state in which the light including the optical signal L1 is not applied to the first ferromagnetic layer 1. When the magnetization M1 of the first ferromagnetic layer 1 changes from the initial state, the resistance value of the photodetection element 10 in the z direction is a second resistance value $R_2$ and the magnitude of the output voltage from the photodetection element 10 has a second value.

That is, when the intensity of the light applied to the first ferromagnetic layer 1 changes from the first intensity to the second intensity, the resistance value of the photodetection element 10 in the z direction changes from the first resistance value $R_1$ to the second resistance value $R_2$. In other words, the resistance value of the photodetection element 10 in the z direction changes from the first resistance value $R_1$ to the second resistance value $R_2$ in correspondence with a change in the light applied to the first ferromagnetic layer from the first intensity to the second intensity. The second resistance value $R_2$ is larger than the first resistance value $R_1$ and the second value of the output voltage is larger than the first value. The second resistance value $R_2$ is between a resistance value when the magnetization M1 is parallel to the magnetization M2 (the first resistance value $R_1$) and a resistance value when the magnetization M1 is antiparallel to the magnetization M2. It may be preferable that the magnetization M1 of the first ferromagnetic layer 1 is not inverted according to radiation of light including the optical signal L1 to the first ferromagnetic layer 1.

A spin transfer torque in a direction, which is the same as that of the magnetization M2 of the second ferromagnetic layer 2, acts on the magnetization M1 of the first ferromagnetic layer 1. Therefore, in the case shown in FIG. 6, the magnetization M1 tries to return to a state in which the magnetization M1 is parallel to the magnetization M2 and the photodetection element 10 returns to the initial state when the intensity of the light applied to the first ferromagnetic layer 1 changes from the second intensity to the first intensity. In the case shown in FIG. 7, when the intensity of the light applied to the first ferromagnetic layer 1 returns to the first intensity, the magnitude of the magnetization M1 of the first ferromagnetic layer 1 returns to the original magnitude and the photodetection element 10 returns to the initial state. In any case, when the magnetization M1 returns to the initial state, the resistance value of the photodetection element 10 in the z direction returns to the first resistance value $R_1$. That is, when the intensity of the light applied to the first ferromagnetic layer 1 changes from the second intensity to the first intensity, the resistance value of the photodetection element 10 in the z direction changes from the second resistance value $R_2$ to the first resistance value $R_1$. In other words, the resistance value of the photodetection element 10 in the z direction changes from the second resistance value $R_2$ to the first resistance value $R_1$ in correspondence with the change from the second intensity to the first intensity of the light applied to the first ferromagnetic layer.

In any mechanism, when the photodetection element 10 according to the first embodiment operates in the first pattern, the resistance value of the photodetection element 10 in the lamination direction changes in correspondence with a change in the intensity of the light applied to the first ferromagnetic layer 1. That is, the output voltage from the photodetection element 10 changes in correspondence with a change in the intensity of the light applied to the first ferromagnetic layer 1. As a result, the photodetection element 10 can convert a change in the intensity of the optical signal L1 into a change in the resistance value of the photodetection element 10 in the z direction, i.e., a change in the output voltage from the photodetection element 10. In the examples shown in FIGS. 6 and 7, the resistance value in the lamination direction of the photodetection elements 10, i.e., the output voltage from the photodetection elements 10, becomes a value corresponding to the intensity of the light applied to the first ferromagnetic layer 1. This method of operation can be applied, for example, when the first ferromagnetic layer 1 comprises the CoFeB alloy. Based on common sense, there has not been any reason that the CoFeB alloy can be used as a photodetection layer, even though this material is famous for hard disk read head or magnetic random-access memory. However, by using this method of operation, the CoFeB alloy can be used as a photodetection layer and the magnetic element whose first ferromagnetic layer 1 comprises the CoFeB alloy can work as a photodetection element. The use of the CoFeB alloy for the first ferromagnetic layer 1 is beneficial because the output voltage from the photodetection element 10 can be large when the light is applied. It is great benefit that the magnetic material which can show a large output voltage like the CoFeB alloy can be used, whereas no one has never thought of the use of the CoFeB alloy as a photodetection layer. The output voltage signal from the photodetection element 10 representing the resistance value of the photodetection element 10 in the z direction is sent to the signal processing unit 11, the output voltage from the photodetection element 10 (the resistance value of the photodetection element 10 in the z direction) greater than or equal to the threshold value is processed as a first signal (for example, "1") and the output voltage less than the threshold value is processed as a second signal (for example, "0"). That is, the receiving device 100 receives the optical signal L1 on the basis of the output voltage from the photodetection element 10 (the resistance value of the photodetection element 10 in the z direction).

Figure 8:
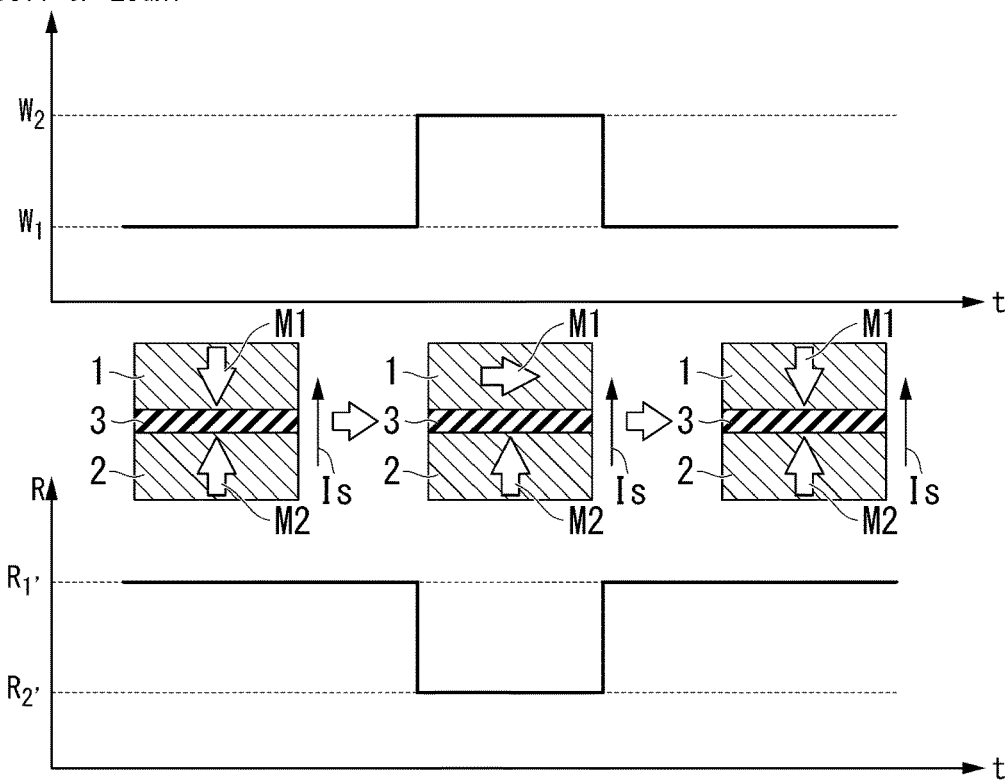
FIG. 8 is a schematic diagram for describing an operation of a second pattern of the photodetection element according to the first embodiment in the first mechanism.
Figure 9:
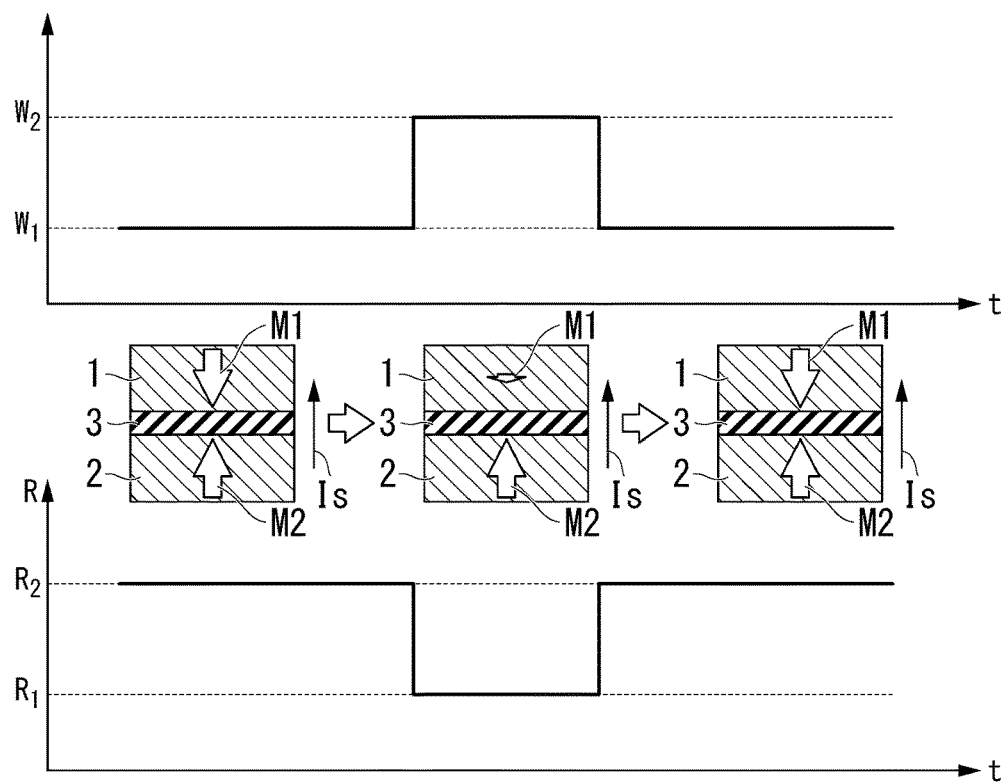
FIG. 9 is a schematic diagram for describing the operation of the second pattern of the photodetection element according to the first embodiment in the second mechanism.

FIGS. 8 and 9 are diagrams for describing an operation of the second pattern of the photodetection element 10 according to the first embodiment. FIG. 8 is a diagram for describing the first mechanism and FIG. 9 is a diagram for describing the second mechanism. In the upper graphs of FIGS. 8 and 9, the vertical axis represents an intensity of light applied to the first ferromagnetic layer 1 and the horizontal axis represents time. In the lower graphs of FIGS. 8 and 9, the vertical axis represents a resistance value of the photodetection element 10 in the z direction and the horizontal axis represents time.

A difference of the second pattern from the first pattern is that the magnetization M1 of the first ferromagnetic layer 1 is antiparallel to the magnetization M2 of the second ferromagnetic layer 2 in the initial state, and the operation principle of the second pattern is similar to that of the first pattern.

First, in a state in which light of the first intensity is applied to the first ferromagnetic layer 1, the magnetization M1 of the first ferromagnetic layer 1 is antiparallel to the magnetization M2 of the second ferromagnetic layer 2, the resistance value of the photodetection element 10 in the z direction is a first resistance value $R_{1'}$ and the magnitude of the output voltage from the photodetection element 10 has the first value. In the case of the second pattern shown in FIGS. 8 and 9, the sense current Is may flow in a direction from the second ferromagnetic layer 2 to the first ferromagnetic layer 1. By causing the sense current Is to flow in the above direction, a spin transfer torque in a direction opposite to that of the magnetization M2 of the second ferromagnetic layer 2 acts on the magnetization M1 of the first ferromagnetic layer 1 and the magnetization M1 becomes antiparallel to the magnetization M2 in the initial state. In the second pattern, the direction of the sense current Is is opposite to that of the first pattern, so that a magnetization direction (a magnetization stabilization direction) of the first ferromagnetic layer 1 in the initial state is reversed.

Next, the intensity of the light applied to the first ferromagnetic layer 1 changes from the first intensity to the second intensity. The second intensity is greater than the first intensity and the magnetization M1 of the first ferromagnetic layer 1 changes from the initial state. For example, as shown in FIG. 8, when the intensity of the light applied to the first ferromagnetic layer 1 changes from the first intensity to the second intensity, the magnetization M1 is tilted in the z direction. Also, for example, as shown in FIG. 9, when the intensity of the light applied to the first ferromagnetic layer 1 changes from the first intensity to the second intensity, the magnitude of the magnetization M1 decreases. When the magnetization M1 of the first ferromagnetic layer 1 changes, the resistance value of the photodetection element 10 in the z direction is a second resistance value $R_{2'}$ and the magnitude of the output voltage from the photodetection element 10 has the first value. That is, when the intensity of the light applied to the first ferromagnetic layer 1 changes from the first intensity to the second intensity, the resistance value of the photodetection element 10 in the z direction changes from the first resistance value $R_{1'}$ to the second resistance value $R_{2'}$. In other words, the resistance value of the photodetection element 10 in the z direction changes from the first resistance value $R_{1'}$ to the second resistance value $R_{2'}$ in correspondence with the change of the light applied to the first ferromagnetic layer from the first intensity to the second intensity. The second resistance value $R_{2'}$ is smaller than the first resistance value and the second value of the output voltage is smaller than the first value. The second resistance value $R_{2'}$ is between a resistance value when the magnetization M1 is antiparallel to the magnetization M2 (the first resistance value $R_{1'}$) and a resistance value when the magnetization M1 is parallel to the magnetization M2 (the first resistance value $R_1$ of FIG. 6).

A spin transfer torque in a direction opposite to that of the magnetization M2 of the second ferromagnetic layer 2 acts on the magnetization M1 of the first ferromagnetic layer 1. Thus, in the case shown in FIG. 8, the magnetization M1 tilted from the initial state returns to the initial state when the intensity of the light applied to the first ferromagnetic layer 1 changes from the second intensity to the first intensity. In the case shown in FIG. 9, when the intensity of the light applied to the first ferromagnetic layer 1 returns to the first intensity, the magnitude of the magnetization M1 of the first ferromagnetic layer 1 returns to the original magnitude and the photodetection element 10 returns to the initial state. When the magnetization M1 returns to the initial state, the resistance value of the photodetection element 10 in the z direction returns to the first resistance value That is, when the intensity of the light applied to the first ferromagnetic layer 1 changes from the second intensity to the first intensity, the resistance value of the photodetection element 10 in the z direction changes from the second resistance value $R_{2'}$ to the first resistance value $R_{1'}$. In other words, the resistance value of the photodetection element 10 in the z direction changes from the second resistance value $R_{2'}$ to the first resistance value $R_{1'}$ in correspondence with the change from the second intensity to the first intensity of the light applied to the first ferromagnetic layer.

In any mechanism, when the photodetection element 10 according to the first embodiment operates in the second pattern, the resistance value in the lamination direction of the photodetection element 10 changes in correspondence with a change in the intensity of the light applied to the first ferromagnetic layer 1. That is, the output voltage from the photodetection element 10 changes in correspondence with a change in the intensity of the light applied to the first ferromagnetic layer 1. As a result, the photodetection element 10 can convert a change in the intensity of the optical signal L1 into a change in the resistance value of the photodetection element 10 in the z direction, i.e., a change in the output voltage from the photodetection element 10. In the examples shown in FIGS. 8 and 9, the resistance value of the photodetection element 10 in the lamination direction, i.e., the output voltage from the photodetection element 10, becomes a value corresponding to the intensity of the light applied to the first ferromagnetic layer 1. The output voltage signal from the photodetection element 10 representing the resistance value of the photodetection element 10 in the z direction is sent to the signal processing unit 11, the output voltage from the photodetection element 10 (the resistance value of the photodetection element 10 in the z direction) greater than or equal to the threshold value is processed as a first signal (for example, "1") and the output voltage less than the threshold value is processed as a second signal (for example, "0"). That is, the receiving device 100 receives the optical signal L1 on the basis of the output voltage from the photodetection element 10 (the resistance value of the photodetection element 10 in the z direction).

In this way, a bias, which acts to direct the magnetization M1 in a direction parallel or antiparallel to the direction of the magnetization M2, is applied to the magnetization M1 of the first ferromagnetic layer 1, so that the resistance value of the photodetection element 10, i.e., the output voltage from the photodetection element 10, can be changed in correspondence with a change in the intensity of the light applied to the first ferromagnetic layer 1. In the examples of the first pattern and the second pattern described above, the effect of applying the spin transfer torque by the sense current Is is used as a bias application effect. The bias application effect is not limited to the effect of applying the spin transfer torque by the sense current Is, and for example, other bias application effects as shown in the second to fourth modified examples to be described below may be used.

Here, the case where the orientation directions of the magnetization M1 and the magnetization M2 in the initial state are not oriented in the correct direction due to external factors such as an external magnetic field and heat is also taken into account. Thus, a reset current may be applied to the photodetection element 10 in the z direction before the photodetection element 10 according to the first embodiment is operated.

The reset current is current having a current density sufficient to reverse the magnetization M1 of the first ferromagnetic layer 1. In the case of the first pattern, the reset current flows from the first ferromagnetic layer 1 to the second ferromagnetic layer 2. In the case of the second pattern, the reset current flows from the second ferromagnetic layer 2 to the first ferromagnetic layer 1. When the reset current flows through the photodetection element 10 in the z direction, a spin transfer torque (STT) is applied to the magnetization M1 and the magnetization M1 of the first ferromagnetic layer 1 is oriented in the correct direction. In each pattern, the value of the reset current is larger than the value of the sense current.

Although the case where the light applied to the first ferromagnetic layer 1 has two levels of the first intensity and the second intensity has been described above as an example, the photodetection element 10 according to the first embodiment can read multi-valued information from the optical signal L1 by increasing the number of levels of the intensity of the light applied to the first ferromagnetic layer 1 to more than two.

Figure 10:
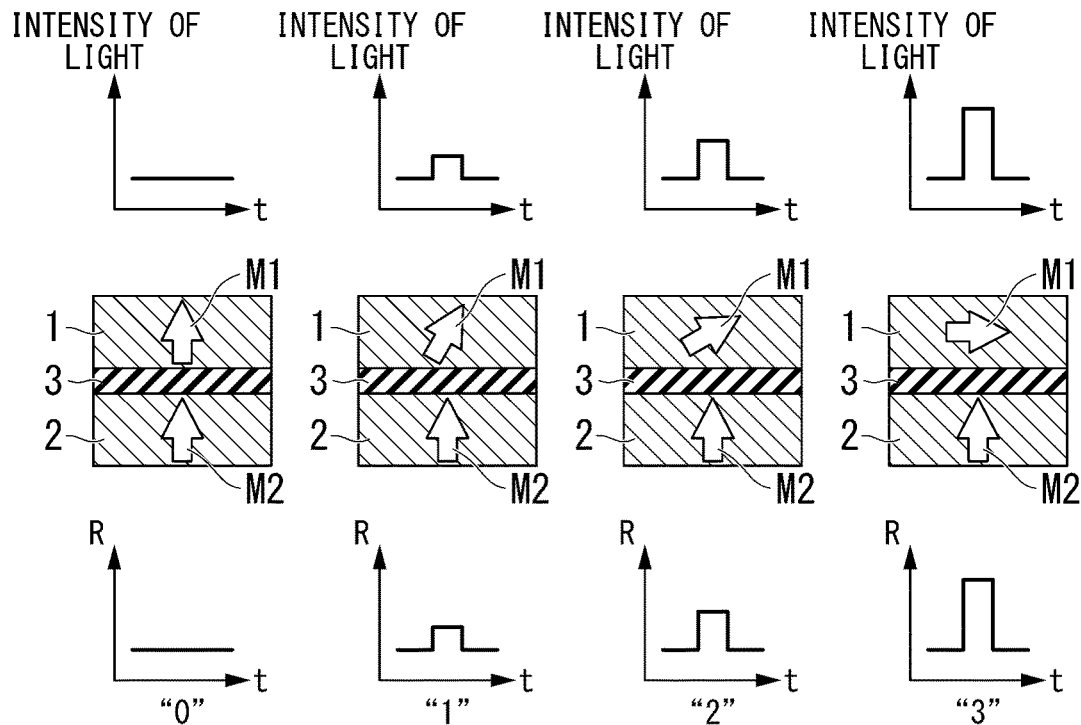
FIG. 10 is a schematic diagram for describing an operation of the photodetection element when multiple values are output using the photodetection element according to the first embodiment in the first mechanism.
Figure 11:
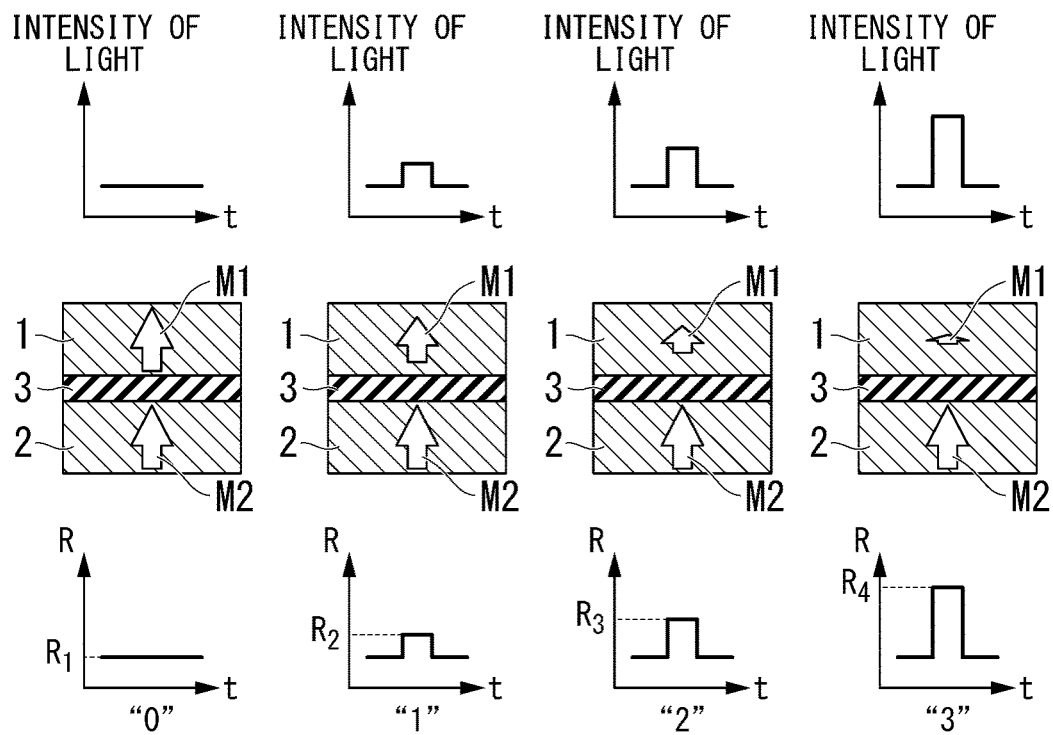
FIG. 11 is a schematic diagram for describing an operation of the photodetection element when multiple values are output using the photodetection element according to the first embodiment in the second mechanism.

FIGS. 10 and 11 show the behavior of the photodetection element 10 when the photodetection element 10 according to the first embodiment is used to output multiple values. FIG. 10 is a diagram for describing the first mechanism and FIG. 11 is a diagram for describing the second mechanism. FIGS. 10 and 11 show the magnetization state of the photodetection element 10 and the resistance value in the z direction at each of a first intensity, a second intensity, a third intensity, and a fourth intensity in order from the left. The intensity of the light applied to the first ferromagnetic layer 1 is higher in the order of the fourth intensity, the third intensity, the second intensity, and the first intensity. As the first intensity, the intensity of the light applied to the first ferromagnetic layer 1 may be zero.

As shown in FIG. 10, when the magnetization M1 is tilted in accordance with the intensity of the light applied to the first ferromagnetic layer 1, a change in the angle of the magnetization M1 from the initial state increases as the intensity of the light applied to the first ferromagnetic layer 1 increases. An angle between the direction of the magnetization M1 of the first ferromagnetic layer 1 in a state in which light including the optical signal L1 is not applied to the first ferromagnetic layer 1 and the direction of the magnetization M1 in each of the second intensity, the third intensity, and the fourth intensity is larger than 0° and smaller than 90°. A change in the resistance value of the photodetection element 10 in the z direction with respect to the initial state increases as the change in the angle of the magnetization M1 from the initial state increases. In the example shown in FIG. 10, the resistance value of the photodetection element 10 in the z direction increases as the change in the angle of the magnetization M1 from the initial state increases. Therefore, the resistance value of the photodetection element 10 in the z direction differs according to each of the first intensity, the second intensity, the third intensity, and the fourth intensity. For example, the photodetection element 10 according to the first embodiment can read information of four values of "0," "1," "2," and "3" by separately defining a threshold value of the output voltage (a threshold value of the resistance value) at a plurality of levels. Although the case where four values are read is shown as an example here, the number of values to be read can be freely designed by setting the threshold value of the output voltage (the threshold value of the resistance value). It may be preferable that the magnetization M1 of the first ferromagnetic layer 1 is not inverted according to radiation of light including the optical signal L1 to the first ferromagnetic layer 1.

Likewise, in the case of FIG. 11, when the intensity of the light applied to the first ferromagnetic layer 1 increases, the magnitude of the magnetization M1 of the first ferromagnetic layer 1 also decreases from the initial state due to the external energy generated by the irradiation of the light. When the magnetization M1 of the first ferromagnetic layer 1 decreases from the initial state, the resistance value of the photodetection element 10 in the z direction changes. For example, the resistance value of the photodetection element 10 in the z direction changes to a second resistance value $R_2$, a third resistance value $R_3$, or a fourth resistance value $R_4$ in accordance with a magnitude of the magnetization M1 of the first ferromagnetic layer 1. Therefore, as in the case of FIG. 10, the difference in the output voltage from the photodetection element 10 can be output as multi-valued or analog data.

Although the case where the magnetization M1 is parallel to the magnetization M2 in the initial state has been described as an example here, the magnetization M1 may be antiparallel to the magnetization M2 in the initial state. As in FIG. 10, when the magnetization M1 is tilted in accordance with the intensity of the light applied to the first ferromagnetic layer 1, the resistance value of the photodetection element 10 in the z direction decreases as a change in an angle of the magnetization M1 from the initial state increases.

Figure 12:
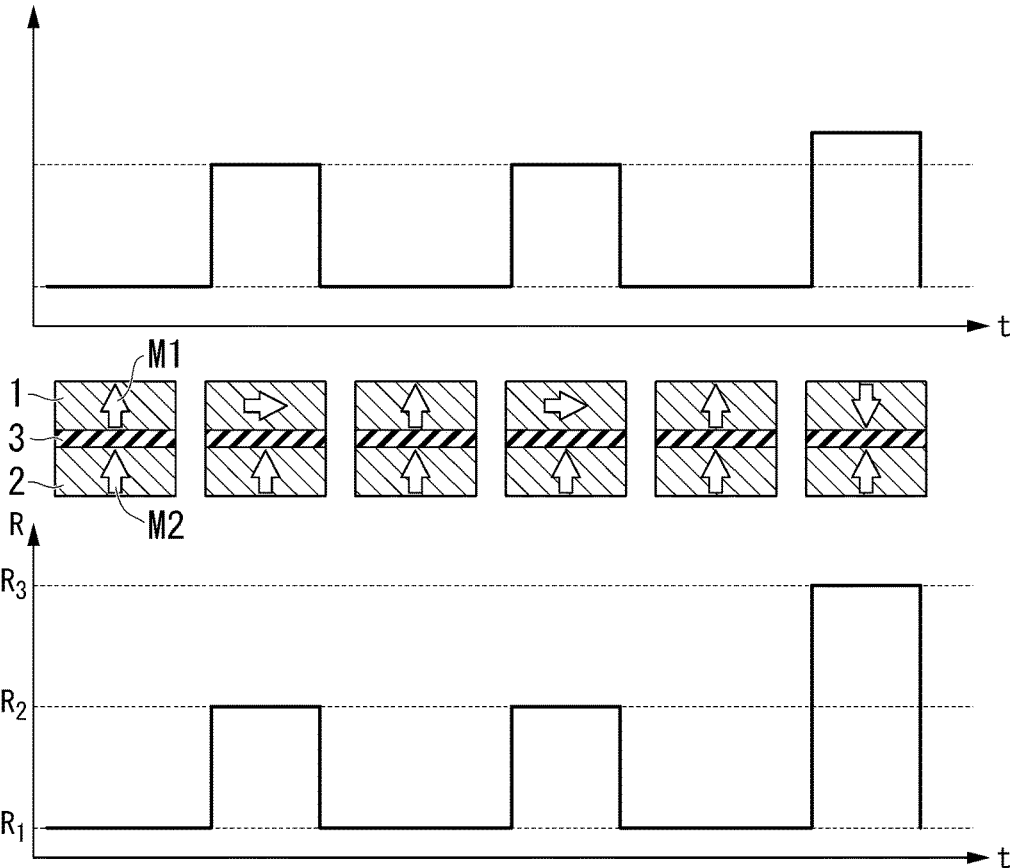
FIG. 12 is a schematic diagram showing the behavior of the photodetection element when an abnormality occurs in the photodetection element according to the first embodiment.

Next, an operation when an abnormality occurs in the photodetection element 10 will be described. FIG. 12 shows the behavior of the photodetection element 10 when an abnormality occurs in the photodetection element 10 according to the first embodiment. In the upper graph of FIG. 12, the vertical axis represents an intensity of light applied to the first ferromagnetic layer 1 and the horizontal axis represents time. In the lower graph of FIG. 12, the vertical axis represents a resistance value of the photodetection element 10 in the z direction and the horizontal axis represents time.

FIG. 12 is an example in which an abnormality occurs when the photodetection element 10 is operating in the first pattern. As an example of the abnormality, the case where the intensity of a part of the optical signal L1 applied to the first ferromagnetic layer 1 is increased abnormally is shown. The abnormality is not limited to the case where the light intensity becomes excessive, and may be, for example, a change in the operating temperature, a change in the intensity of the applied external magnetic field, or the like. When the operating temperature or the external magnetic field changes, the stability of the magnetization M1 also changes.

When the photodetection element 10 operates normally in the first pattern, the resistance value of the photodetection element 10 in the z direction changes between the first resistance value $R_1$ and the second resistance value $R_2$. On the other hand, when excessive light is applied to the first ferromagnetic layer 1, the magnetization M1 may be significantly tilted from the initial state and the magnetization M1 may be inverted. In this case, the magnetization M1 of the first ferromagnetic layer 1 is antiparallel to the magnetization M2 of the second ferromagnetic layer 2 and the resistance value becomes the third resistance value $R_3$ (is the same as the first resistance value $R_1$, of the second pattern). The third resistance value $R_3$ is larger than the first resistance value $R_1$ and the second resistance value $R_2$ and an abnormality is detected.

When an abnormality has occurred in the photodetection element 10, the above-described reset current is applied. By applying the reset current, the magnetization M1 of the first ferromagnetic layer 1 returns to the correct direction and the photodetection element 10 can be used normally again. Although the first mechanism has been described here, a principle of the second mechanism is similar to that of the first mechanism. In the case of the second mechanism, when excessive light is applied to the first ferromagnetic layer 1, the magnetization M1 may be significantly decreased from the initial state and the magnetization M1 may be inverted.

As described above, the transceiver device 300 and the receiving device 100 according to the first embodiment receive the optical signal on the basis of the output voltage from the photodetection element 10 (the resistance value of the photodetection element 10). Also, the photodetection element 10 according to the first embodiment can convert a change in the intensity of the optical signal L1 into a change in the output voltage from the photodetection element 10 (a change in the resistance value of the photodetection element 10 in the z direction) and cope with high-speed communication.

Also, the magnetization M1 of the first ferromagnetic layer 1 becomes likely to tilt as the volume of the first ferromagnetic layer 1 decreases as described above. In other words, if the volume of the first ferromagnetic layer 1 decreases, the magnetization M1 can be tilted with a small amount of light. That is, the photodetection element 10 according to the first embodiment can receive the optical signal L1 with high sensitivity.

More precisely, the tiltability of the magnetization M1 is determined by a magnitude of the product (KuV) of the magnetic anisotropy (Ku) and the volume (V) of the first ferromagnetic layer 1, the magnetization is tilted with a smaller amount of light as KuV decrease, and the magnetization is not tilted if an amount of light is not large as KuV increases. That is, KuV of the first ferromagnetic layer 1 is designed in accordance with an amount of light applied from the outside and used in the application. When photon detection is assumed with an extremely small amount of light, it is possible to detect a small amount of light by reducing KuV of the first ferromagnetic layer. Detection of such a small amount of light cannot be performed by a conventional photodetection element, which is a great merit. That is, photon detection is also enabled by reducing the volume of the first ferromagnetic layer 1, i.e., reducing the element area or the thickness of the first ferromagnetic layer 1, in order to reduce KuV.

Also, the photodetection element 10 according to the first embodiment can receive the optical signal L1 regardless of the wavelength range of the light applied to the photodetection element 10. In a semiconductor photodetector using the pn junction, an appropriate semiconductor material differs according to the wavelength of the light applied to the semiconductor photodetector. For example, InGaAs or the like is used for detecting near-infrared light having a wavelength of 1.3 μm or more and 1.5 μm or less. Also, for example, silicon is used for detecting visible light having a wavelength of 400 nm or more and 800 nm or less.

Figure 13:
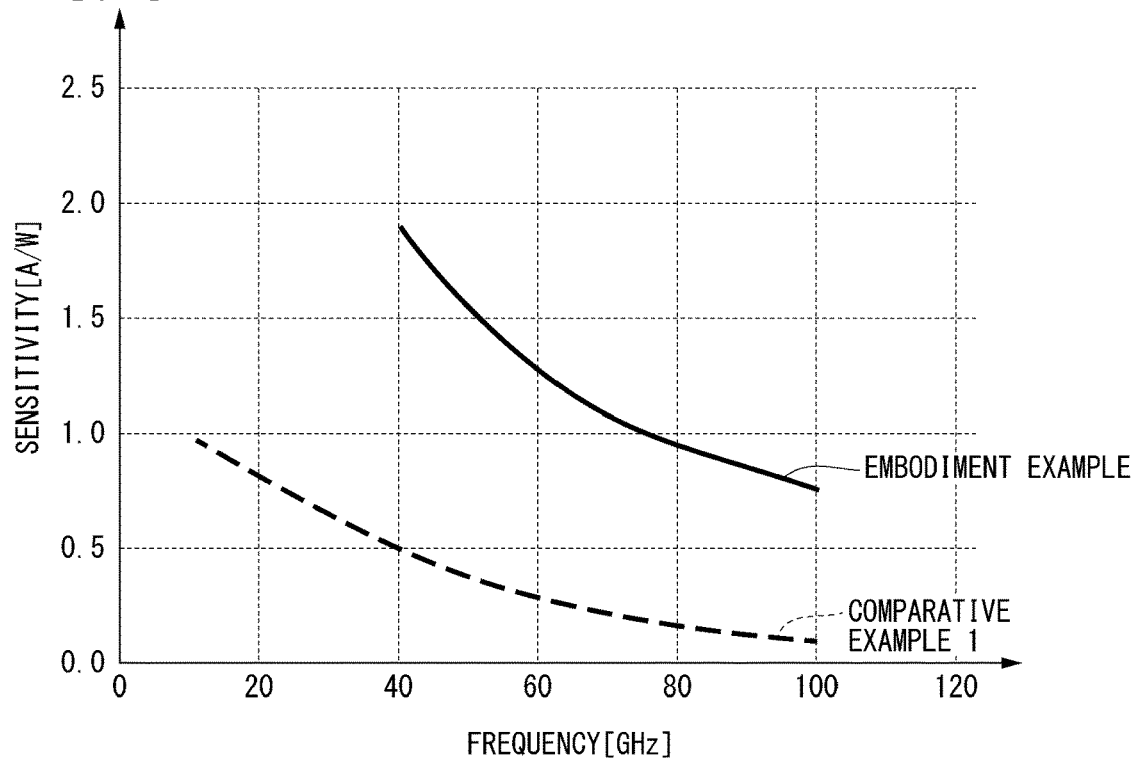
FIG. 13 is a diagram showing simulation results of sensitivities of an embodiment example and Comparative Example 1.

FIG. 13 is a diagram showing a simulation result of the sensitivity of the photodetection element 10 (embodiment example) according to the first embodiment when the wavelength of the applied light is 1.5 μm (near-infrared light) and a curve (an approximate curve of sensitivity data of a plurality of known examples) representing a characteristic level of the conventional semiconductor photodiode (Comparative Example 1) using InGaAs. Also, FIG. 14 a diagram showing a simulation result of the sensitivity of the photodetection element 10 (embodiment example) according to the first embodiment when the wavelength of the applied light is 520 nm (visible light) and a curve (an approximate curve of sensitivity data of a plurality of known examples) representing a characteristic level of the conventional semiconductor photodiode (Comparative Example 2) using silicon.

Simulation conditions of the embodiment example were set as follows. The photodetection element 10 has a square planar shape, a side length of 200 nm, an area resistance (RA) of 5 Ωm², and a magnetoresistance change rate (an MR change rate) of 65%. The second ferromagnetic layer 2 (the magnetization fixed layer) was an alloy layer including CoFeB having a thickness of 2 nm, the spacer layer 3 was MgO, and the first ferromagnetic layer 1 was an alloy layer including CoFeB having a thickness of 1.2 nm. Also, a spot diameter of the light applied to the photodetection element 10 was set to 900 nmφ. The sensitivity on the vertical axis of the graph is an amount of output current with respect to a unit light radiation amount. In the embodiment example, an amount of output current was calculated by dividing the output voltage, which is a potential difference between the first electrode 15 and the second electrode 16, by a minimum resistance value of the photodetection element 10 (the resistance value in a state in which the magnetization M1 is parallel to the magnetization M2 in the case of the first mechanism).

Figure 14:
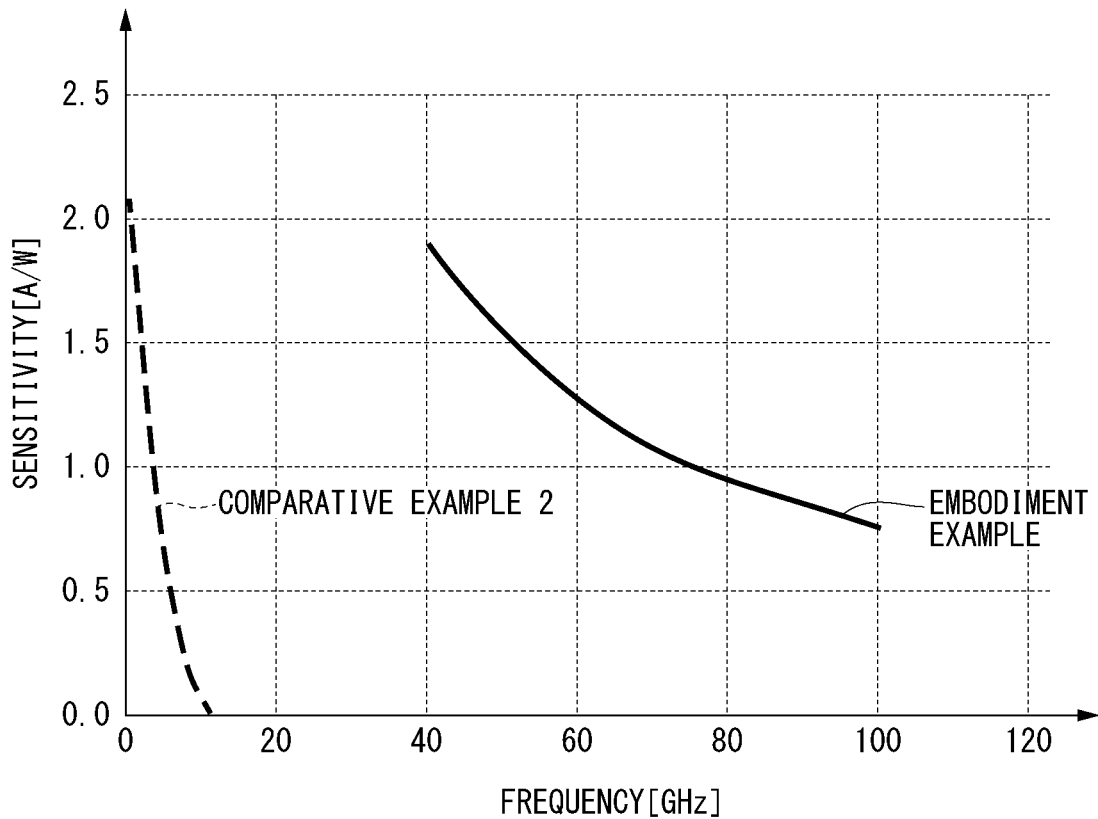
FIG. 14 is a diagram showing simulation results of sensitivities of an embodiment example and Comparative Example 2.

When restrictions for practical use (an intensity of an optical signal and matching with a peripheral circuit) are taken into account, a sensitivity of 0.5 A/W or more is required normally. As shown in FIG. 13, in Comparative Example 1 using InGaAs suitable for near-infrared light, it is also not possible to receive a high-speed optical signal of more than 40 GHz with high sensitivity. On the other hand, the photodetection element 10 according to the embodiment example can receive a high-speed signal of more than 100 GHz with high sensitivity. Also, as shown in FIG. 14, in Comparative Example 2 using silicon suitable for visible light, it is possible to receive only an optical signal of less than 3 GHz with high sensitivity and it is not possible to cope with a high-speed signal. On the other hand, the photodetection element 10 according to the embodiment example can also receive a high-speed signal of more than 100 GHz with high sensitivity as in the case of near-infrared light.

That is, the photodetection element 10 according to the first embodiment can receive a high-speed optical signal with high sensitivity regardless of visible light or near-infrared light. Although examples of visible light and near-infrared light have been shown here, the present disclosure is not limited to the examples and, for example, the photodetection element 10 can similarly respond to ultraviolet light having a wavelength of 200 nm or more and less than 400 nm at a high speed.

Although the first embodiment has been described in detail with reference to the drawings, the first embodiment is not limited to the above example.

First Modified Example

Figure 15:
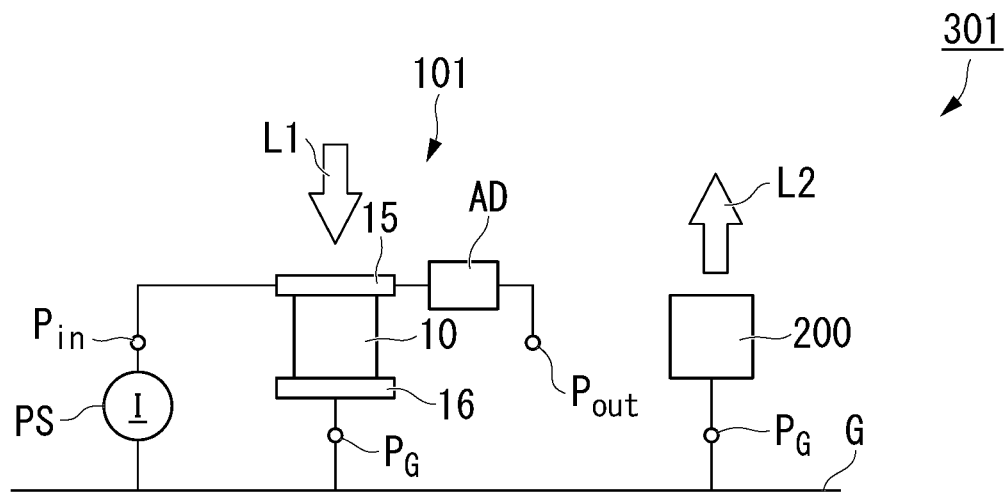
FIG. 15 is a circuit diagram of a transceiver device according to a first modified example.

FIG. 15 is a circuit diagram of a transceiver device 301 according to a first modified example. The transceiver device 301 according to the first modified example is different from the transceiver device 300 in that a receiving device 101 has an analog-to-digital converter AD. Components, which are the same as those in FIG. 3, are designated by the same reference signs and the description thereof will be omitted.

The analog-to-digital converter AD is positioned between a first electrode 15 and an output terminal $P_{out}$. The analog-to-digital converter AD converts an output voltage from a photodetection element 10 (a resistance value of the photodetection element 10 in a z direction) into digital data. That is, the transceiver device 301 according to the first modified example is not easily affected by noise or the like. The transceiver device 301 according to the first modified example can be particularly preferably used when the photodetection element 10 outputs multiple values.

Second Modified Example

Figure 16:
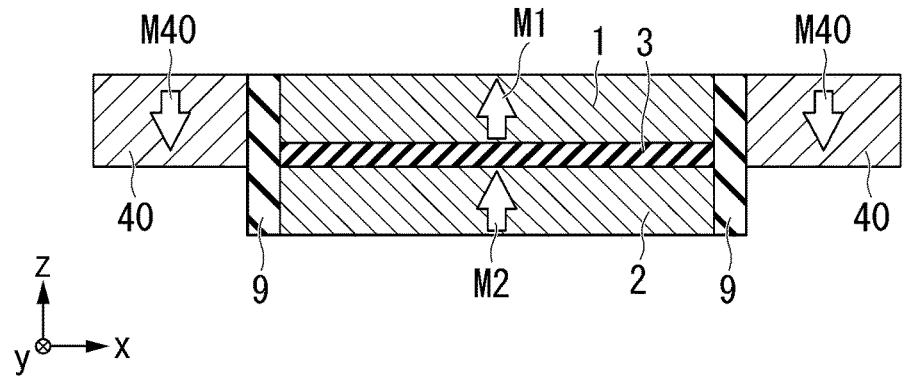
FIG. 16 is a cross-sectional view of a photodetection element according to a second modified example cut along a plane in a z direction.
Figure 17:
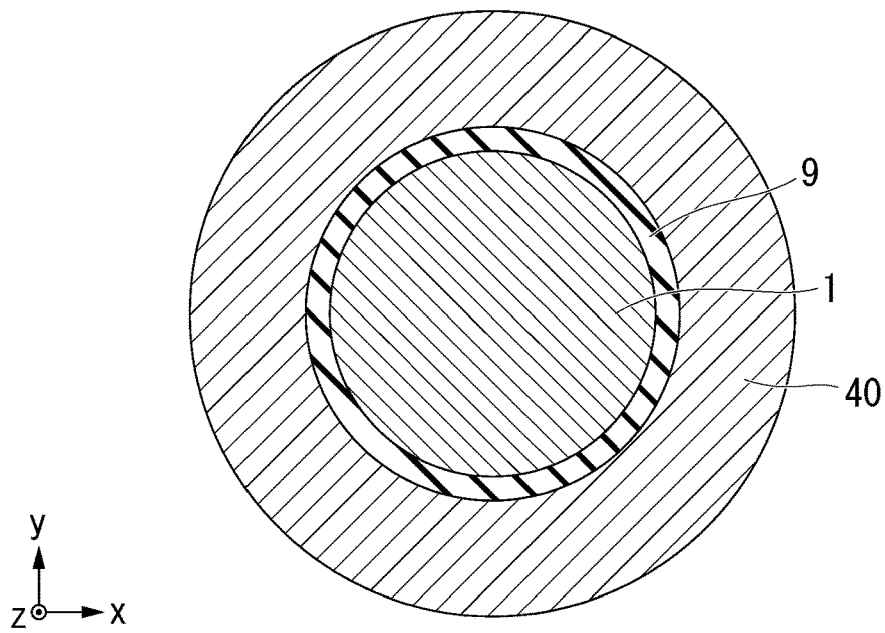
FIG. 17 is a cross-sectional view of the photodetection element according to the second modified example and its periphery cut along an xy plane passing through a first ferromagnetic layer 1.

FIG. 16 is a cross-sectional view of a photodetection element according to a second modified example and its periphery cut along a plane in the z direction. FIG. 17 is a cross-sectional view of the photodetection element according to the second modified example and its periphery cut along an xy plane passing through the first ferromagnetic layer 1. A receiving device according to the second modified example further includes a hard bias layer 40 that applies a bias magnetic field to a first ferromagnetic layer 1. Components, which are the same as those in FIG. 5, are designated by the same reference signs and the description thereof will be omitted.

The hard bias layer 40 is positioned at a position overlapping the first ferromagnetic layer 1 when viewed from any direction orthogonal to a z direction. There is a sidewall insulating layer 9 between the hard bias layer 40 and the first ferromagnetic layer 1. As shown in FIG. 17, for example, the hard bias layer 40 surrounds the periphery of the first ferromagnetic layer 1. For example, a plurality of hard bias layers 40 may be provided to sandwich the first ferromagnetic layer 1 in any direction in the xy plane.

The hard bias layer 40 is a hard magnet. The hard bias layer 40 is, for example, a laminated film in which a CoPt alloy, a CoPtCr alloy, a FePt alloy, a Co layer, and a Pt layer can be alternately laminated. A thickness of the hard bias layer 40 is, for example, 2 nm or more and 30 nm or less. The shortest width of the hard bias layer 40 within the xy plane is, for example, 10 nm or more and 500 nm or less.

The hard bias layer 40 has an axis of easy magnetization in the same direction as the first ferromagnetic layer 1. A magnetization direction of magnetization M40 of the hard bias layer 40 is opposite to a magnetization direction of magnetization M1 of the first ferromagnetic layer 1 in a state in which it is not irradiated with light. The hard bias layer 40 may be an in-plane magnetization film or a perpendicular magnetization film.

A leakage magnetic field generated from the hard bias layer 40 acts on the magnetization M1 as a bias magnetic field applied to the first ferromagnetic layer 1. In the case of the first pattern described above, the magnetization M1 is parallel to magnetization M2 in an initial state. In the case of the second pattern described above, the magnetization M1 is antiparallel to the magnetization M2 in the initial state. Also, the leakage magnetic field generated from the hard bias layer 40 prevents the magnetization M1 of the first ferromagnetic layer 1 from being inverted during an operation. That is, the application of the leakage magnetic field generated from the hard bias layer 40 to the first ferromagnetic layer 1 produces the effect of applying the bias to the magnetization M1 of the first ferromagnetic layer 1.

Third Modified Example

Figure 18:
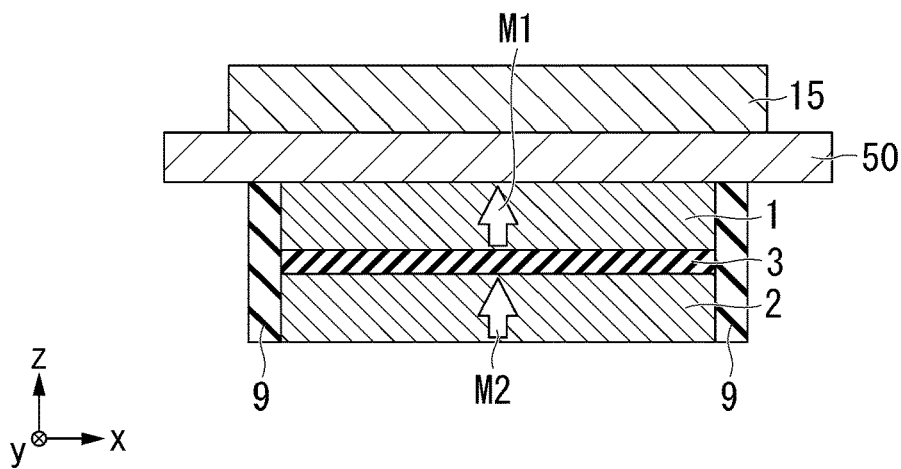
FIG. 18 is a cross-sectional view of a photodetection element according to a third modified example cut along a plane in the z direction.

FIG. 18 is a cross-sectional view of a photodetection element according to a third modified example cut along a surface in a z direction. The photodetection element according to the third modified example further includes a wiring layer 50. Components, which are the same as those in FIG. 5, are designated by the same reference signs and the description thereof will be omitted.

The wiring layer 50 is positioned between a first electrode 15 and a first ferromagnetic layer 1. The wiring layer 50 extends in any direction within an xy plane.

When current flows along the wiring layer 50, a spin current is generated by a spin Hall effect and spin is injected into the first ferromagnetic layer 1. The spin injected into the first ferromagnetic layer 1 applies a spin-orbit torque (SOT) to magnetization M1 of the first ferromagnetic layer 1.

The wiring layer 50 includes, for example, a nonmagnetic heavy metal as a main element. The main element is an element having the highest proportion among elements constituting the wiring layer 50. The wiring layer 50 includes, for example, a heavy metal having specific gravity higher than or equal to that of yttrium (Y). Because nonmagnetic heavy metals have a large atomic number of 39 or more and have d-electrons or f-electrons in the outermost shell, spin-orbit interaction occurs strongly. The wiring layer 50 includes, for example, any one selected from the group consisting of Pt, W, Ta, Au, Hf, and Mo. For W and Ta, a β-phase crystal structure may be used in order to increase the spin-orbit interaction effect. A thickness of the wiring layer 50 may be 1 to 10 nm or 1 to 5 nm.

By causing current to flow through the wiring layer 50, spin is injected from the wiring layer 50 into the first ferromagnetic layer 1 and the effect of applying a bias to the magnetization M1 of the first ferromagnetic layer 1 is generated. By changing a direction of the current flowing through the wiring layer 50, the direction of the spin injected from the wiring layer 50 into the first ferromagnetic layer 1 can be changed and a direction of magnetization M1 of the first ferromagnetic layer 1 (a magnetization stabilization direction of the magnetization M1) in an initial state can be changed. According to the direction of the spin injected from the wiring layer 50 into the first ferromagnetic layer 1, control can be performed so that the magnetization M1 is parallel to the magnetization M2 in the initial state in the case of the above-described first pattern and the magnetization M1 is antiparallel to the magnetization M2 in the initial state in the case of the above-described second pattern. Also, the spin injected from the wiring layer 50 into the first ferromagnetic layer 1 prevents the magnetization M1 of the first ferromagnetic layer 1 from being inverted during operation. The direction of the spin injected from the wiring layer 50 into the first ferromagnetic layer 1 can be freely controlled according to a direction of current flowing along the wiring layer 50.

Fourth Modified Example

Figure 19:
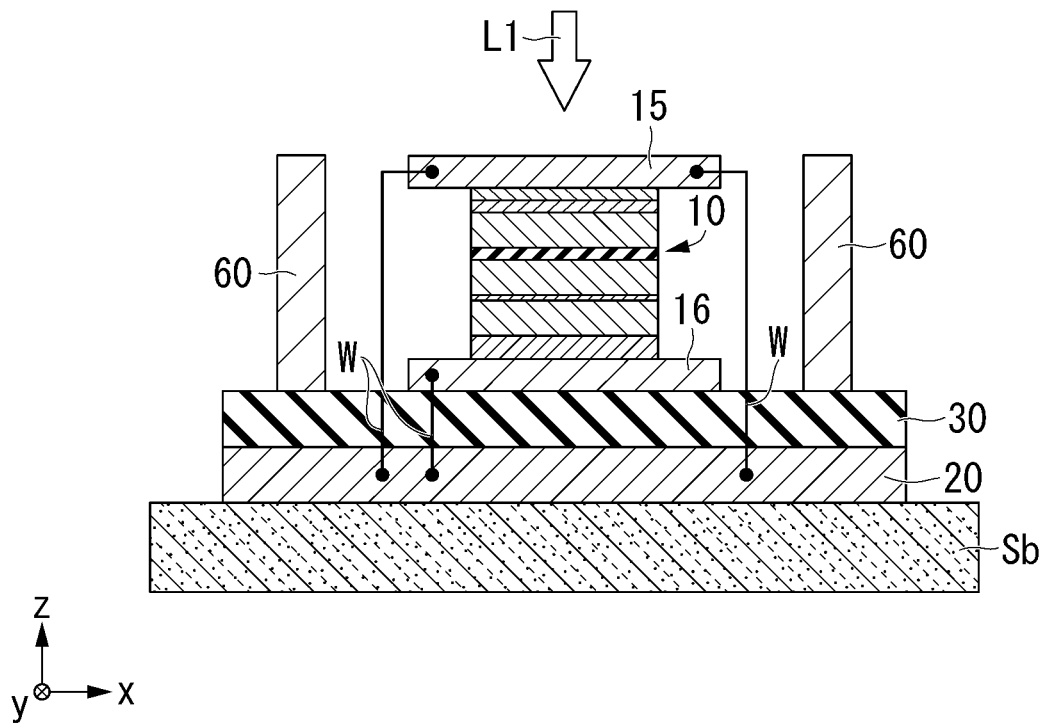
FIG. 19 is a cross-sectional view of a receiving device according to a fourth modified example cut along a plane in the z direction.
Figure 20:
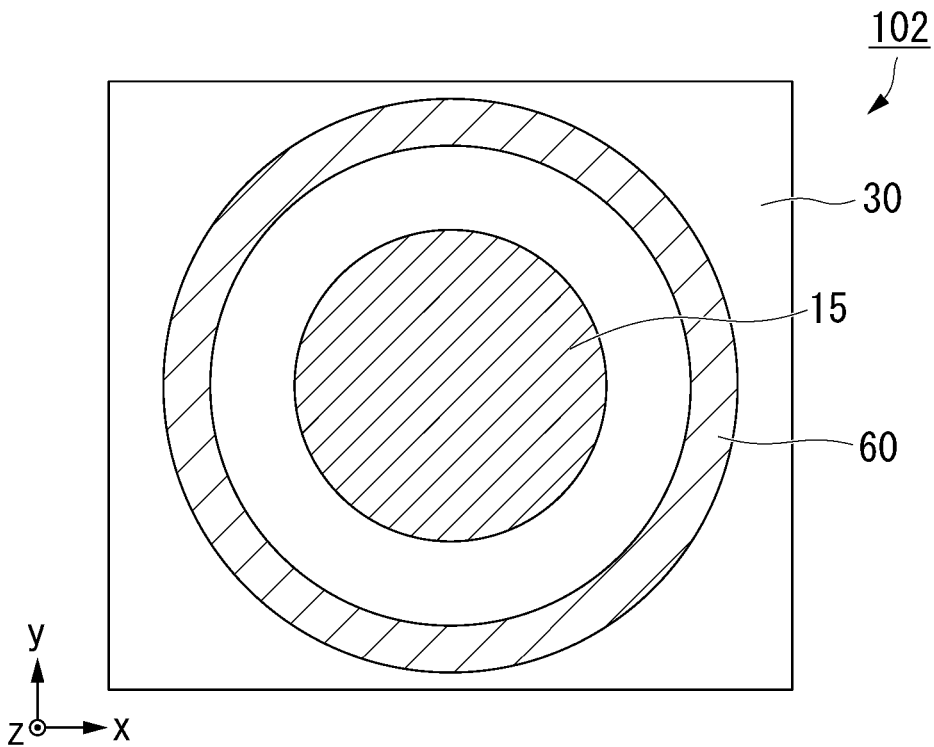
FIG. 20 is a plan view of the receiving device according to the fourth modified example in the z direction.

FIG. 19 is a cross-sectional view of a receiving device 102 according to a fourth modified example cut along a plane in the z direction. FIG. 20 is a plan view of the receiving device 102 according to the fourth modified example from the z direction. The receiving device 102 according to the fourth modified example further includes a soft magnetic material 60. Components, which are the same as those in FIG. 4, are designated by the same reference signs and the description thereof will be omitted.

The soft magnetic material 60 is a magnetic shield. The soft magnetic material 60 covers at least a part of the outer circumference of a photodetection element 10 from outside in a plan view from the z direction. The soft magnetic material 60 overlaps at least a part of the first ferromagnetic layer 1 when viewed from any direction within an xy plane. For example, the soft magnetic material 60 covers the entire outer circumference of the photodetection element 10 in a plan view of the photodetection element from the z direction. The soft magnetic material 60 overlaps all of the outer circumference of the first ferromagnetic layer 1 in the z direction when viewed from any direction within the xy plane.

The soft magnetic material 60 is, for example, a metal or an alloy including at least one of Fe, Ni, and Co. The soft magnetic material 60 is, for example, a NiFe alloy. The soft magnetic material 60 may be a magnet having an insulating property. The soft magnetic material 60 is, for example, a ceramic such as ferrite. The soft magnetic material 60 is, for example, a rare earth iron garnet (RIG). Yttrium iron garnet (YIG) is an example of rare earth iron garnet (RIG).

The soft magnetic material 60 can limit the application of an external magnetic field to the first ferromagnetic layer 1 and prevent the first ferromagnetic layer 1 from exhibiting unexpected behavior.

Fifth Modified Example

Figure 21:
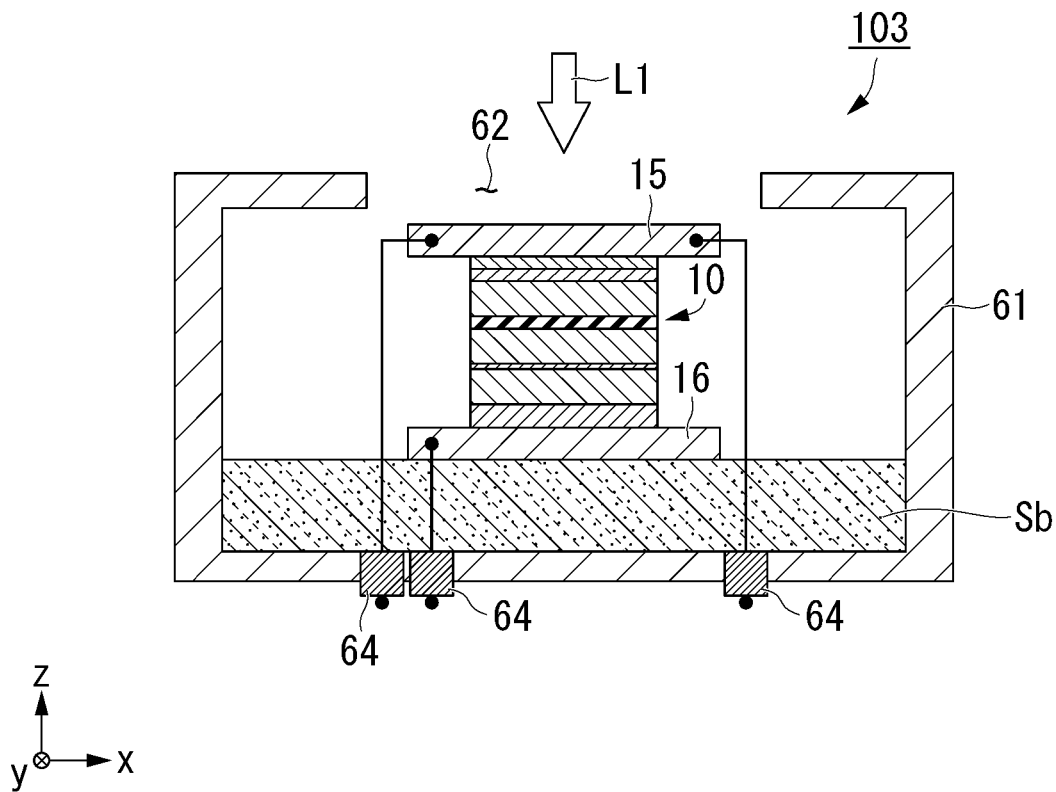
FIG. 21 is a cross-sectional view of a receiving device according to a fifth modified example cut along a plane in the z direction.
Figure 22:
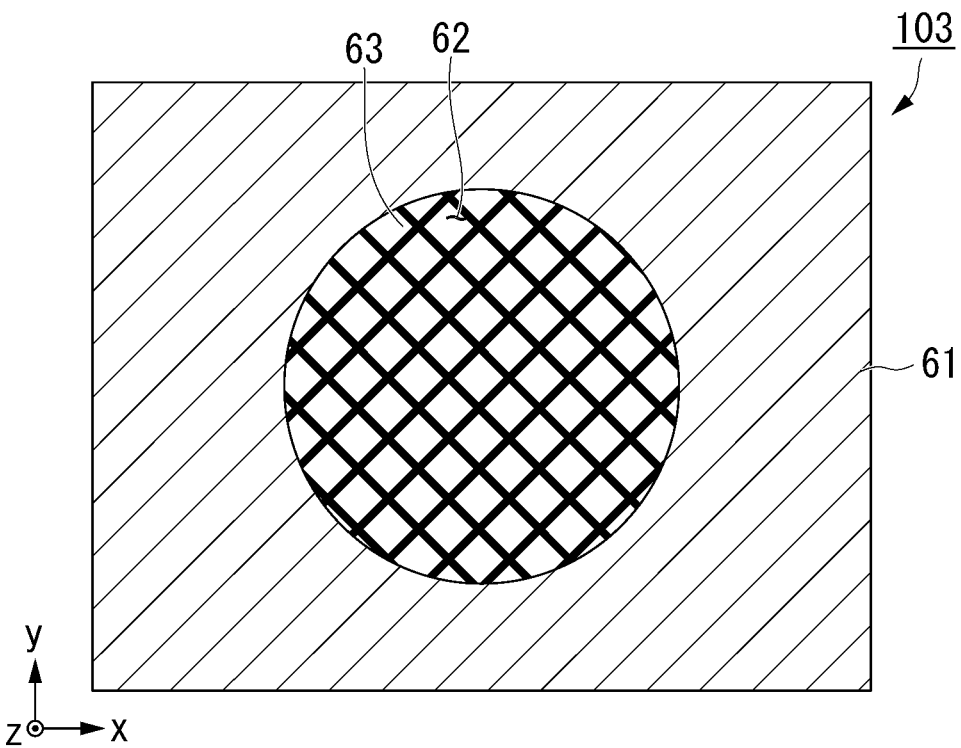
FIG. 22 is a plan view of the receiving device according to the fifth modified example in the z direction.

FIG. 21 is a cross-sectional view of a receiving device 103 according to a fifth modified example cut along a plane in the z direction. FIG. 22 is a plan view of the receiving device 103 according to the fifth modified example from the z direction. The receiving device 103 according to the fifth modified example further includes a soft magnetic material 61. Components, which are the same as those in FIG. 4, are designated by the same reference signs and the description thereof will be omitted.

The soft magnetic material 61 is a magnetic shield. The soft magnetic material 61 is different from the soft magnetic material 60 in that it is also positioned above and below a photodetection element 10. The soft magnetic material 61 surrounds the periphery of the photodetection element 10 except for an opening 62. As the soft magnetic material 61, a material similar to that of the soft magnetic material 60 can be used.

The soft magnetic material 61 has the opening 62 above a side where light is incident on the photodetection element 10. The opening 62 is formed on the first ferromagnetic layer 1 side of the soft magnetic material 61 positioned above and below the photodetection element 10. The opening 62 has a mesh-like magnetic net 63 connected to the soft magnetic material 61. The magnetic net 63 includes a magnet and includes, for example, a material similar to that of the soft magnetic material 61.

Wiring connected to a first electrode 15 and a second electrode 16 is connected to an external contact point provided outside the soft magnetic material 61 with an insulating layer 64 interposed therebetween.

By providing the soft magnetic material 61 above and below the photodetection element 10, a magnetic shielding effect is further enhanced. Also, by providing the opening 62 in the soft magnetic material 61, the first ferromagnetic layer 1 can be efficiently irradiated with light having an optical signal L1. Further, by providing the magnetic net 63 in the opening 62, it is possible to limit the intrusion of an external magnetic field from the opening 62.

Sixth Modified Example

Figure 23:
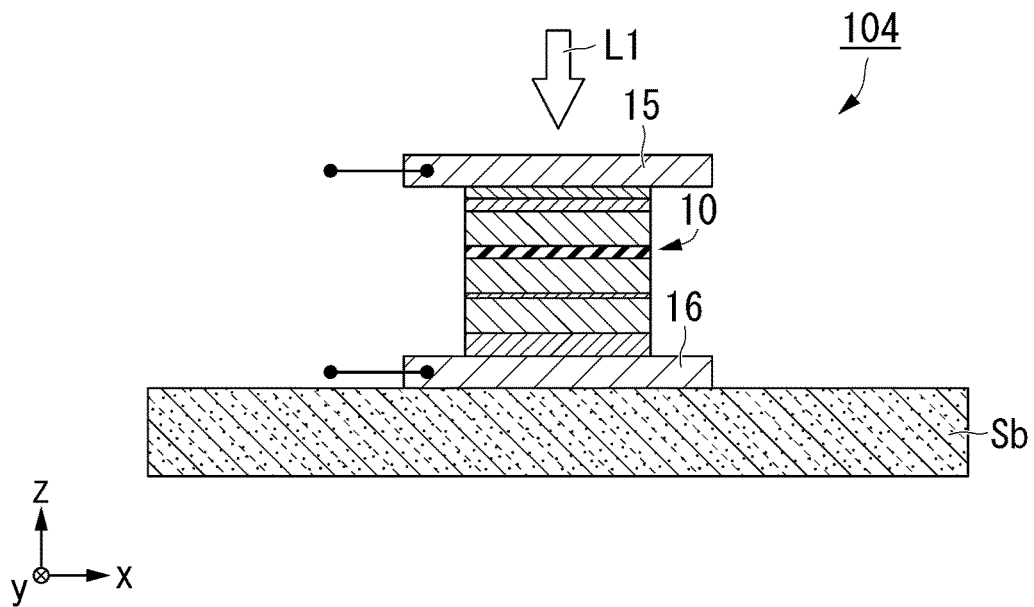
FIG. 23 is a cross-sectional view of a receiving device according to a sixth modified example.

FIG. 23 is a cross-sectional view of a receiving device 104 according to a sixth modified example. Components, which are the same as those in FIG. 4, are designated by the same reference signs and the description thereof will be omitted.

In the receiving device 104 according to the sixth modified example, a photodetection element 10 is formed on a substrate Sb. In the receiving device 104 according to the sixth modified example, an integrated circuit 20 may be formed in a peripheral portion of the substrate Sb where the photodetection element 10 is not formed, or may be formed outside the substrate. The integrated circuit 20 is connected to the photodetection element 10 via wiring.

Second Embodiment

An operation of a photodetection element of a receiving device according to a second embodiment is different from that of the receiving device 100 according to the first embodiment. An element configuration of the receiving device according to the second embodiment is similar to that of the receiving device according to the first embodiment.

Figure 24:
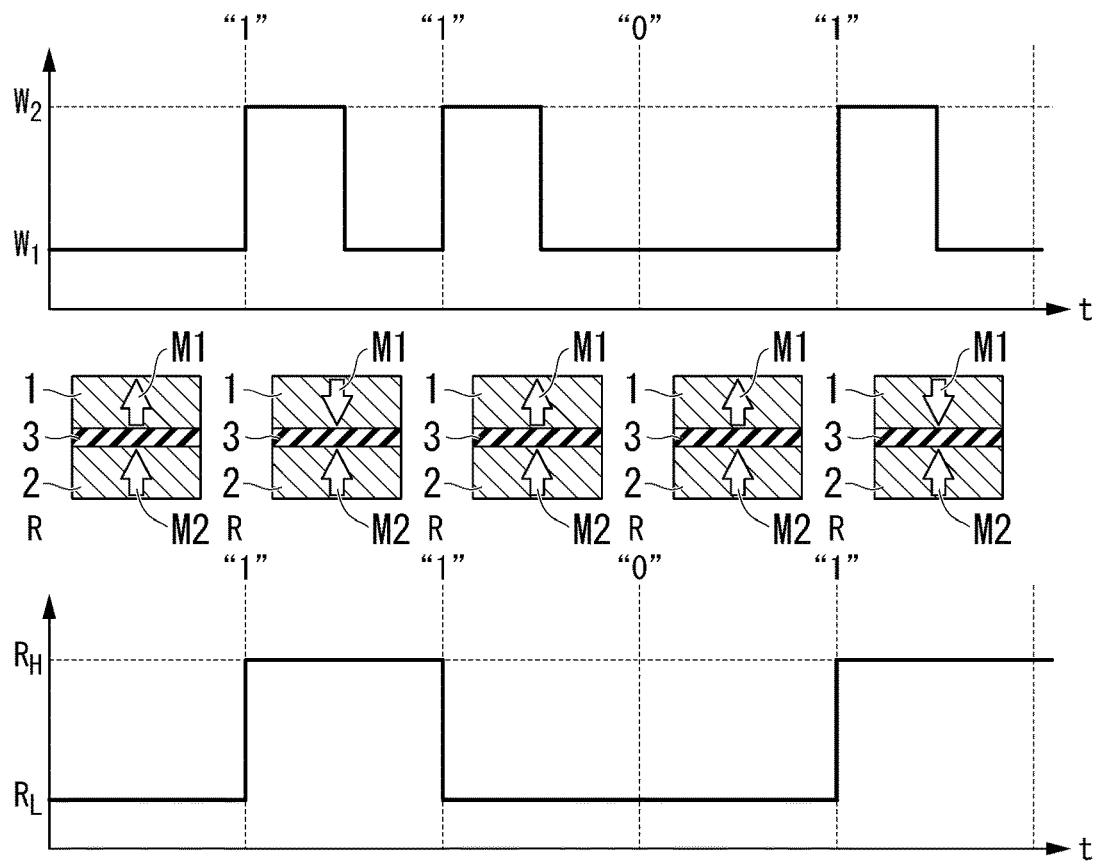
FIG. 24 is a diagram for describing an operation of a receiving device according to a second embodiment.

FIG. 24 is a diagram for describing the operation of the receiving device according to the second embodiment. In the receiving device according to the second embodiment, a signal indicating that an output voltage from the photodetection element 10 (a resistance value of a photodetection element 10 in a z direction) changes within a prescribed time period is processed as a first signal (for example, "1") and a signal indicating that the output voltage from the photodetection element 10 (the resistance value of the photodetection element 10 in the z direction) does not change within the prescribed time period is processed as a second signal (for example, "0"). In other words, a change of the output voltage from the photodetection element 10 within a prescribed time period is processed as a first signal (for example, "1") and lack of change of the output voltage from the photodetection element 10 within the prescribed time period is processed as a second signal (for example, "0"). The prescribed time period is determined by a modulation frequency of the optical signal.

Hereinafter, an operation of the receiving device according to the second embodiment will be specifically described on the basis of the example shown in FIG. 24. First, an optical signal applied to the photodetection element 10 is defined. The optical signal when an intensity of light applied to the first ferromagnetic layer 1 changes from a first intensity to a second intensity is defined as "1" and the optical signal when the intensity of light applied to the first ferromagnetic layer 1 is maintained at the first intensity for a prescribed time period is defined as "0." The intensity of light that has changed from the first intensity to the second intensity returns to the first intensity after the lapse of a certain period of time.

The optical signal is applied to the first ferromagnetic layer 1 of the photodetection element 10. When the intensity of the light applied to the first ferromagnetic layer 1 changes from the first intensity to the second intensity, magnetization M1 of the first ferromagnetic layer 1 is inverted. When the intensity of the light applied to the first ferromagnetic layer 1 returns from the second intensity to the first intensity, the magnetization M1 of the first ferromagnetic layer 1 is not inverted. The resistance value of the photodetection element in the z direction changes from low resistance $R_L$ to high resistance $R_H$ or from high resistance $R_H$ to low resistance $R_L$ when the intensity of the light applied to the first ferromagnetic layer 1 changes from the first intensity to the second intensity. That is, when the intensity of the light applied to the first ferromagnetic layer 1 changes from the first intensity to the second intensity, a resistance value of the photodetection element 10, i.e., an output voltage from the photodetection element 10, changes in any case regardless of whether the magnetization M1 of the first ferromagnetic layer 1 is parallel or antiparallel to magnetization M2 of a second ferromagnetic layer 2. That is, when information of "1" is input as the optical signal, the output voltage from the photodetection element 10 (the resistance value of the photodetection element 10) changes. By setting "1" indicating that the output voltage from the photodetection element 10 (the resistance value of the photodetection element 10 in the z direction) changes within a prescribed time period, the receiving device according to the second embodiment can receive an optical signal of "1" as a signal of "1" on the basis of the output voltage from the photodetection element 10 (the resistance value of the photodetection element 10).

On the other hand, when light is not applied to the first ferromagnetic layer 1 of the photodetection element 10 or the intensity of the applied light is low, the magnetization M1 of the first ferromagnetic layer 1 maintains its state. Thus, when the intensity of the light applied to the first ferromagnetic layer 1 is maintained at the first intensity for a prescribed time period, the resistance value of the photodetection element 10 in the z direction, i.e., an output voltage of from the photodetection element 10, does not change. That is, when information of "0" has been input as the optical signal, the output voltage from the photodetection element 10 (the resistance value of the photodetection element) does not change. By setting "0" indicating that the output voltage from the photodetection element 10 (the resistance value of the photodetection element 10 in the z direction) does not change within a prescribed time period, the receiving device according to the second embodiment can receive the optical signal of "0" as a signal of "0" on the basis of the output voltage from the photodetection element 10 (the resistance value of the photodetection element 10).

As described above, the receiving device according to the second embodiment can receive an optical signal as the presence or absence of a change in the output voltage from the photodetection element 10 (a change in the resistance value of the photodetection element in the z direction) within a prescribed time period. Also, the photodetection element according to the second embodiment detects a change in the resistance between the case where the magnetization M1 of the first ferromagnetic layer 1 is parallel to the magnetization M2 of the second ferromagnetic layer 2 and the case where the magnetization M1 of the first ferromagnetic layer 1 is antiparallel to the magnetization M2 of the second ferromagnetic layer 2 and an amount of change in the output voltage is large.

Also, in the second embodiment, a direction of a sense current flowing through the photodetection element may be a direction from the first ferromagnetic layer 1 to the second ferromagnetic layer 2 or a direction from the second ferromagnetic layer 2 to the first ferromagnetic layer 1. In the third embodiment, the value of the sense current may be small so that the spin transfer torque due to the sense current does not become excessively large. Also, in the second embodiment, because it does not matter whether a state in which the magnetization M1 of the first ferromagnetic layer 1 is parallel to the magnetization M2 of the second ferromagnetic layer 2 is the initial state or a state in which the magnetization M1 of the first ferromagnetic layer 1 is antiparallel to the magnetization M2 of the second ferromagnetic layer 2 is the initial state, no reset current may be applied.

Although the second embodiment has been described in detail with reference to the drawings, the second embodiment is not limited to the above examples. For example, the first modified example, the fourth modified example, the fifth modified example, the sixth modified example, and the like shown in the first embodiment can be applied.

Although examples in which the transceiver device is applied to the communication system 1000 shown in FIG. 1 have been described above in the examples of the first embodiment and the second embodiment, the communication system is not limited to the cases thereof.

Figure 25:
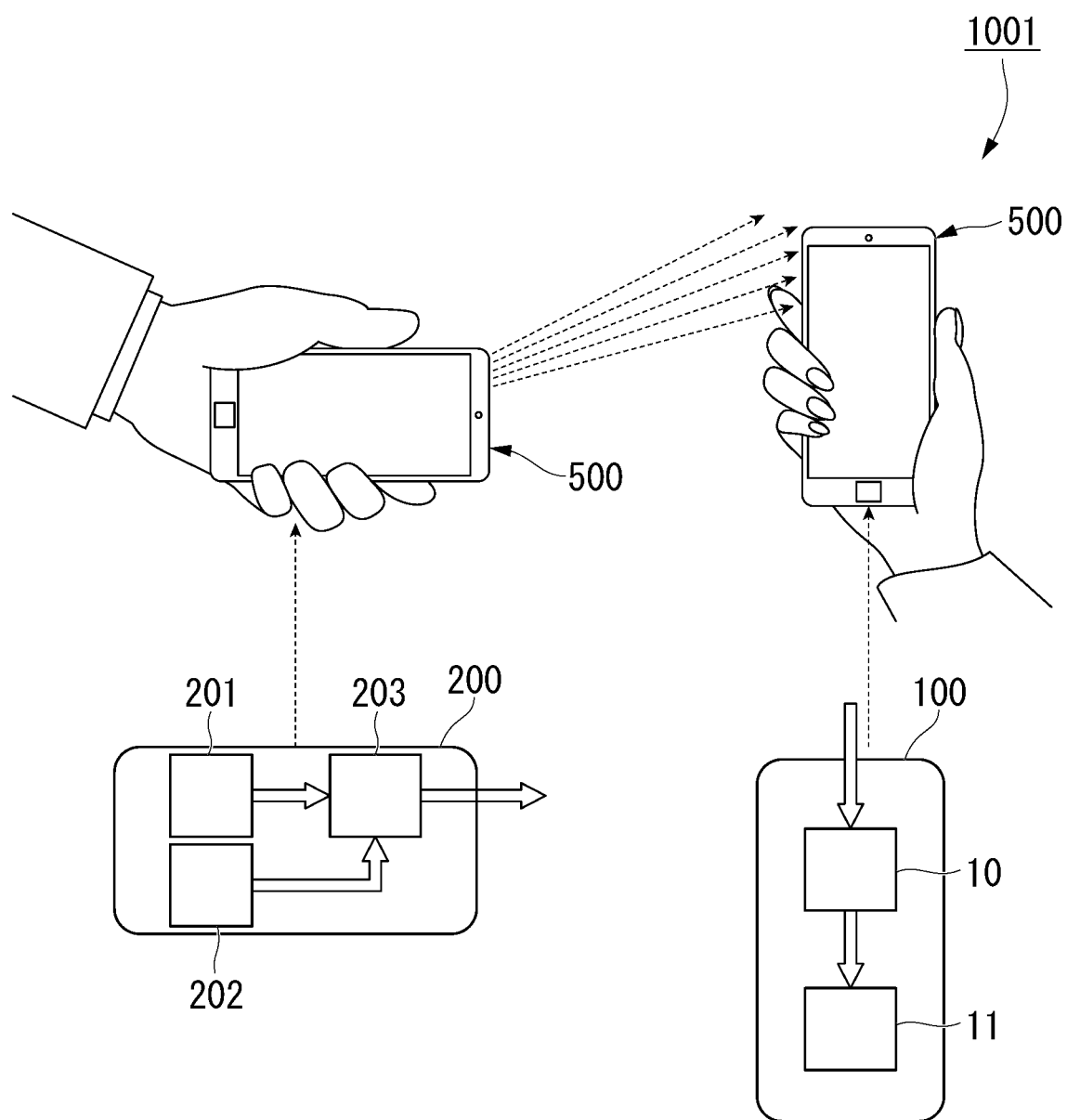
FIG. 25 is a conceptual diagram of another example of the communication system.

For example, FIG. 25 is a conceptual diagram of another example of the communication system. In a communication system 1001 shown in FIG. 25, communication is performed between two portable terminal devices 500. The portable terminal device 500 is, for example, a smartphone, a tablet, or the like.

Each of the portable terminal devices 500 includes a receiving device 100 and a transmission device 200. An optical signal transmitted from the transmission device 200 of one portable terminal device 500 is received by the receiving device 100 of the other portable terminal device 500. Light used for transmission/reception between the portable terminal devices 500 is, for example, visible light. As a photodetection element 10 of each receiving device 100, one of the photodetection elements according to the first embodiment and the second embodiment is applied.

Figure 26:
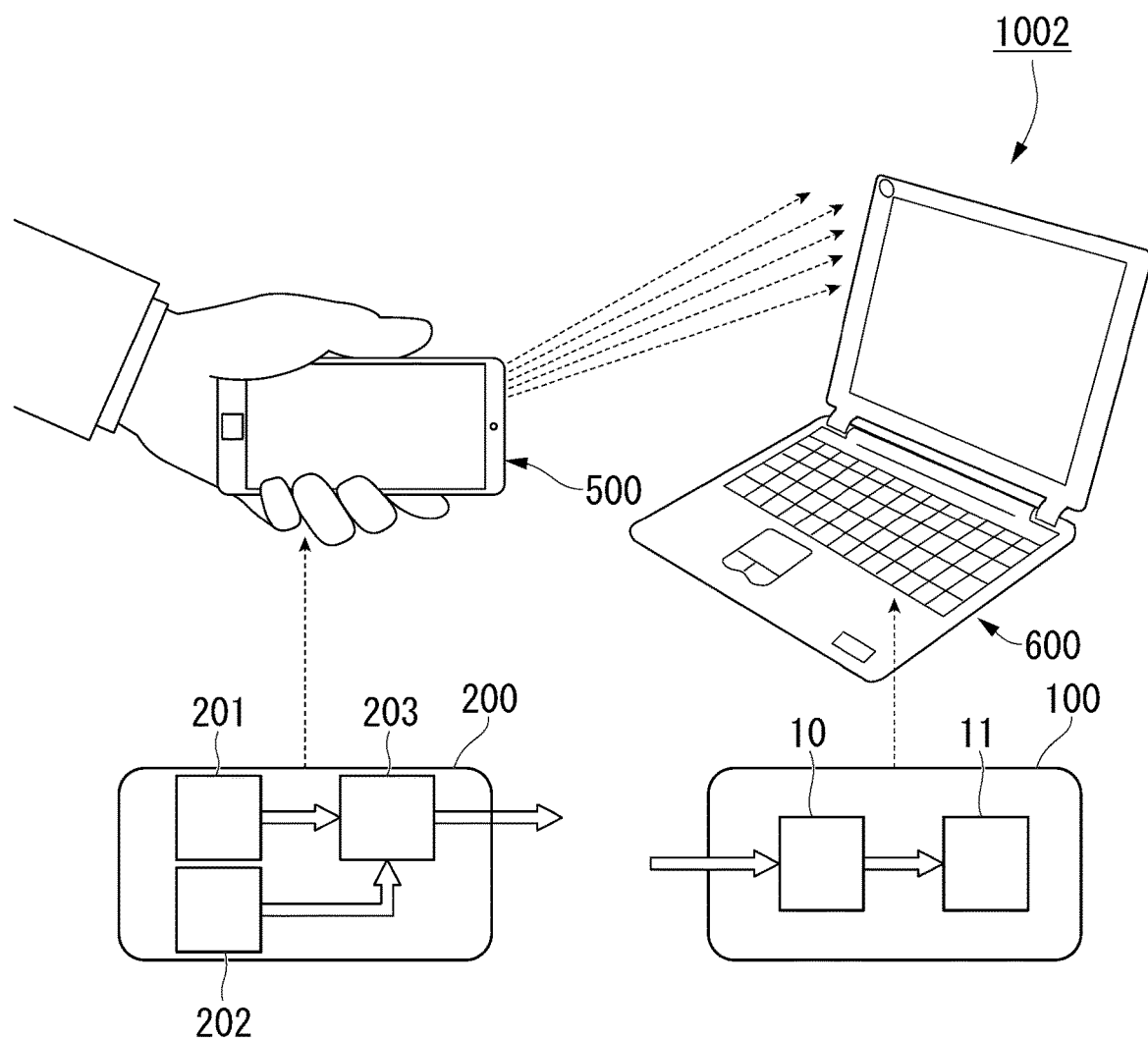
FIG. 26 is a conceptual diagram of another example of the communication system.

Also, for example, FIG. 26 is a conceptual diagram of another example of the communication system. In a communication system 1002 shown in FIG. 26, communication is performed between a portable terminal device 500 and an information processing device 600. The information processing device 600 is, for example, a personal computer.

The portable terminal device 500 includes a transmission device 200 and the information processing device 600 includes a receiving device 100. An optical signal transmitted from the transmission device 200 of the portable terminal device 500 is received by the receiving device 100 of the information processing device 600. Light used for transmission/reception between the portable terminal device 500 and the information processing device 600 is, for example, visible light. As a photodetection element 10 of each receiving device 100, one of the photodetection elements according to the first to third embodiments is applied.

The present disclosure is not limited to the above-described embodiments and modified examples and various modifications and changes can be made within the scope of the subject matter of the present disclosure described within the scope of the claims.

What is claimed is:

1. A receiving device comprising:
   a magnetic element having a first ferromagnetic layer, a second ferromagnetic layer, and a spacer layer sandwiched between the first ferromagnetic layer and the second ferromagnetic layer, wherein the first ferromagnetic layer is configured to be irradiated with light containing an optical signal with a change of intensity of the light, the receiving device is configured to receive the optical signal on a basis of an output voltage from the magnetic element, the output voltage from the magnetic element changes in correspondence with the change in the intensity of the light applied to the first ferromagnetic layer, and an angle between a magnetization direction of the first ferromagnetic layer in a state in which the light is not applied to the first ferromagnetic layer and a magnetization direction of the first ferromagnetic layer in a state in which the light is applied to the first ferromagnetic layer is larger than 0° and smaller than 90°.

2. A transceiver device comprising:
the receiving device according to claim 1; and
a transmission device configured to transmit an optical signal.

3. A communication system comprising:
a plurality of transceiver devices, each of which is the transceiver device according to claim 2.

4. A portable terminal device comprising the receiving device according to claim 1.

5. A receiving device comprising:
a magnetic element having a first ferromagnetic layer, a second ferromagnetic layer, and a spacer layer sandwiched between the first ferromagnetic layer and the second ferromagnetic layer, wherein
the first ferromagnetic layer is configured to be irradiated with light containing an optical signal with a change of intensity of the light,
the receiving device is configured to receive the optical signal on a basis of an output voltage from the magnetic element,
the output voltage from the magnetic element changes in correspondence with the change in the intensity of the light applied to the first ferromagnetic layer, and
a magnetization of the first ferromagnetic layer in a state in which the light is applied to the first ferromagnetic layer is more demagnetized than a magnetization of the first ferromagnetic layer in a state in which the light is not applied to the first ferromagnetic layer.

6. A transceiver device comprising:
the receiving device according to claim 5; and
a transmission device configured to transmit an optical signal.

7. A communication system comprising:
a plurality of transceiver devices, each of which is the transceiver device according to claim 6.

8. A portable terminal device comprising the receiving device according to claim 5.

9. A receiving device comprising:
a magnetic element having a first ferromagnetic layer, a second ferromagnetic layer, and a spacer layer sandwiched between the first ferromagnetic layer and the second ferromagnetic layer, and
a hard bias layer configured to apply a bias magnetic field to the first ferromagnetic layer, wherein
the first ferromagnetic layer is configured to be irradiated with light containing an optical signal with a change of intensity of the light,
the receiving device is configured to receive the optical signal on a basis of an output voltage from the magnetic element, the hard bias layer is at a position overlapping the first ferromagnetic layer when viewed from any direction orthogonal to a lamination direction of the magnetic element, and a magnetization direction of the hard bias layer is opposite to a magnetization direction of the first ferromagnetic layer in a state in which the light is not applied to the first ferromagnetic layer.

10. A transceiver device comprising:
the receiving device according to claim 9; and
a transmission device configured to transmit an optical signal.

11. A communication system comprising:
a plurality of transceiver devices, each of which is the transceiver device according to claim 10.

12. A portable terminal device comprising the receiving device according to claim 9.

13. A receiving device comprising:
a magnetic element having a first ferromagnetic layer, a second ferromagnetic layer, and a spacer layer sandwiched between the first ferromagnetic layer and the second ferromagnetic layer, and
a soft magnetic material, wherein
the first ferromagnetic layer is configured to be irradiated with light containing an optical signal with a change of intensity of the light,
the receiving device is configured to receive the optical signal on a basis of an output voltage from the magnetic element, and
the soft magnetic material covers at least a part of outer circumference of the magnetic element from outside in a plan view from a lamination direction of the magnetic element.

14. The receiving device according to claim 13,
wherein the soft magnetic material is positioned above and below the magnetic element in the lamination direction, and
wherein the soft magnetic material at a side of the first ferromagnetic layer within the soft magnetic material positioned above and below the magnetic element has an opening.

15. The receiving device according to claim 14,
wherein the opening has a mesh-like magnetic net connected to the soft magnetic material.

16. A transceiver device comprising:
the receiving device according to claim 13; and
a transmission device configured to transmit an optical signal.

17. A communication system comprising:
a plurality of transceiver devices, each of which is the transceiver device according to claim 16.

18. A portable terminal device comprising the receiving device according to claim 13.

19. A receiving device comprising:
a magnetic element having a first ferromagnetic layer, a second ferromagnetic layer, and a spacer layer sandwiched between the first ferromagnetic layer and the second ferromagnetic layer, wherein
the first ferromagnetic layer is configured to be irradiated with light containing an optical signal with a change of intensity of the light,
the receiving device is configured to receive the optical signal on a basis of an output voltage from the magnetic element, and
the output voltage from the magnetic element greater than or equal to a threshold value is processed as a first signal and the output voltage from the magnetic element less than the threshold value is processed as a second signal.

20. A transceiver device comprising:
the receiving device according to claim 19; and
a transmission device configured to transmit an optical signal.

21. A communication system comprising:
a plurality of transceiver devices, each of which is the transceiver device according to claim 20.

22. A portable terminal device comprising the receiving device according to claim 19.

23. A receiving device comprising:
a magnetic element having a first ferromagnetic layer, a second ferromagnetic layer, and a spacer layer sandwiched between the first ferromagnetic layer and the second ferromagnetic layer, wherein
the first ferromagnetic layer is configured to be irradiated with light containing an optical signal with a change of intensity of the light,
the receiving device is configured to receive the optical signal on a basis of an output voltage from the magnetic element, and
a signal indicating that the output voltage from the magnetic element changes within a prescribed time period is processed as a first signal and a signal indicating that the output voltage from the magnetic element does not change within the prescribed time period is processed as a second signal.

24. A transceiver device comprising:
the receiving device according to claim 23; and
a transmission device configured to transmit an optical signal.

25. A communication system comprising:
a plurality of transceiver devices, each of which is the transceiver device according to claim 24.

26. A portable terminal device comprising the receiving device according to claim 23.

27. A receiving device comprising:
a magnetic element having a first ferromagnetic layer, a second ferromagnetic layer, and a spacer layer sandwiched between the first ferromagnetic layer and the second ferromagnetic layer, and
an integrated circuit, wherein
the first ferromagnetic layer is configured to be irradiated with light containing an optical signal with a change of intensity of the light,
the receiving device is configured to receive the optical signal on a basis of an output voltage from the magnetic element,
the magnetic element and the integrated circuit are formed on the same substrate via an interlayer insulating film, and
the integrated circuit and the magnetic element are connected via through wiring that passes through the interlayer insulating film.

28. A transceiver device comprising:
the receiving device according to claim 27; and
a transmission device configured to transmit an optical signal.

29. A communication system comprising:
a plurality of transceiver devices, each of which is the transceiver device according to claim 28.

30. A portable terminal device comprising the receiving device according to claim 27.

31. A photodetection element comprising:
a first ferromagnetic layer;
a second ferromagnetic layer; and
a spacer layer sandwiched between the first ferromagnetic layer and the second ferromagnetic layer, wherein
an output voltage changes in correspondence with a change in intensity of light applied to the first ferromagnetic layer, and
an angle between a magnetization direction of the first ferromagnetic layer in a state in which the light is not applied to the first ferromagnetic layer and a magnetization direction of the first ferromagnetic layer in a state in which the light is applied to the first ferromagnetic layer is larger than 0° and smaller than 90°.

32. A photodetection element comprising:
a first ferromagnetic layer;
a second ferromagnetic layer; and
a spacer layer sandwiched between the first ferromagnetic layer and the second ferromagnetic layer, wherein an output voltage changes in correspondence with a change in intensity of light applied to the first ferromagnetic layer, and
a magnetization of the first ferromagnetic layer in a state in which the light is applied to the first ferromagnetic layer is more demagnetized than a magnetization of the first ferromagnetic layer in a state in which the light is not applied to the first ferromagnetic layer.

* * * * *